US008976281B2

(12) United States Patent
Tanaka et al.

(10) Patent No.: US 8,976,281 B2
(45) Date of Patent: Mar. 10, 2015

(54) IMAGE PICKUP DEVICE AND EVALUATION VALUE GENERATING DEVICE

(75) Inventors: Yoshinobu Tanaka, Tokyo (JP); Takashi Yanada, Tokyo (JP)

(73) Assignee: Olympus Corporation, Tokyo (JP)

(*) Notice: Subject to any disclaimer, the term of this patent is extended or adjusted under 35 U.S.C. 154(b) by 266 days.

(21) Appl. No.: 13/614,088

(22) Filed: Sep. 13, 2012

(65) Prior Publication Data

US 2013/0063638 A1  Mar. 14, 2013

(30) Foreign Application Priority Data

Sep. 14, 2011 (JP) ................. 2011-200665

(51) Int. Cl.
*H04N 5/335* (2011.01)
*H04N 5/232* (2006.01)
*H04N 5/374* (2011.01)
*H04N 9/04* (2006.01)

(52) U.S. Cl.
CPC ........... *H04N 5/23212* (2013.01); *H04N 5/374* (2013.01); *H04N 9/045* (2013.01)
USPC .......................................... 348/302; 348/345

(58) Field of Classification Search
USPC ........................................... 348/302
See application file for complete search history.

(56) References Cited

FOREIGN PATENT DOCUMENTS

JP  2008-005048 A  1/2008

*Primary Examiner* — Roberto Velez
*Assistant Examiner* — Stephen Coleman
(74) *Attorney, Agent, or Firm* — Westerman, Hattori, Daniels & Adrian, LLP

(57) ABSTRACT

An image pickup device may include an image capturing unit that includes a solid-state image pickup device having a plurality of pixels arrayed in a matrix form, the image capturing unit sequentially outputting a plurality of image capturing signals each of which corresponds to one of a plurality of pixel signals output from the solid-state image pickup device, and an evaluation value generating unit to which the plurality of image capturing signals output from the image capturing unit are sequentially input, the evaluation value generating unit generating an evaluation value based on the input image capturing signals. The evaluation value generating unit may include a horizontal decimation unit, a vertical decimation unit, a vertical evaluation value generating unit, and a horizontal evaluation value generating unit.

9 Claims, 9 Drawing Sheets

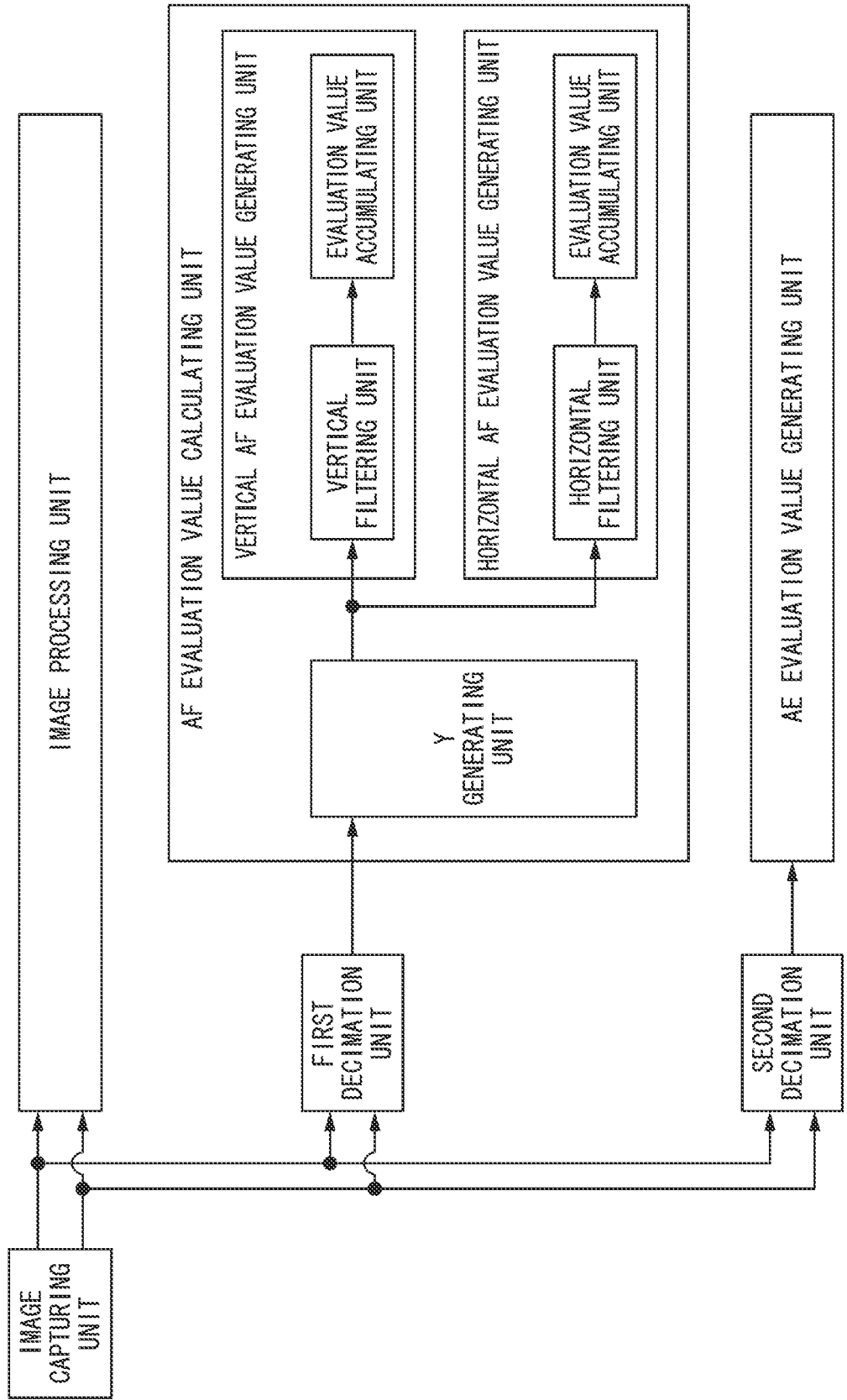

IMAGE PICKUP DEVICE AND EVALUATION VALUE GENERATING DEVICE

BACKGROUND OF THE INVENTION

1. Field of the Invention

The present invention relates to an image pickup device and an evaluation value generating device.

Priority is claimed on Japanese Patent Application No. 2011-200665, filed Sep. 14, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, as image pickup devices such as digital cameras have become faster, cases in which solid-state devices (hereinafter referred to as "imagers") that simultaneously output signals (hereinafter referred to as "pixel signals") of a plurality of pixels are mounted on image capturing units of such image pickup devices have increased. Examples of output methods of the imager in which a plurality of pixel signals are simultaneously output include an output method of simultaneously outputting pixel signals of two horizontally adjacent pixels and an output method of simultaneously outputting pixel signals of two vertically adjacent pixels.

With the advance in performance of next-generation image pickup devices, various methods of outputting the pixel signals from imagers are considered. However, even when there is a difference between the output methods of outputting the pixel signals from the imagers, image capturing processing units (so-called image capturing sub-systems) located on the rear stage to process the pixel signals preferably have the same configuration to correspond to the imagers that realize various output methods.

Accordingly, for example, Japanese Unexamined Patent Application, First Publication No. 2008-005048 discloses a technology for a method of outputting pixel signals corresponding to different imagers. FIG. 8 is a block diagram illustrating the overall configuration of an image pickup device in accordance with the related art, as disclosed in Japanese Unexamined Patent Application, First Publication No. 2008-005048. The image pickup device in accordance with the related art includes image capturing processing units (first and second image processing units) corresponding to the number of channels (in FIG. 8, two channels) of image data output from an image capturing unit so as to be configured to correspond to an imager that simultaneously outputs a plurality of pixel signals.

In the image pickup device in accordance with the related art, a decimation unit is added to each of evaluation value calculating units (an AE evaluation value calculating unit and an AF evaluation value calculating unit) configured to correspond to an image capturing unit in which the number of channels of image data to be output is one (1 ch) to realize the output method of the imager in which the plurality of pixel signals are simultaneously output. The evaluation value calculating units generate evaluation values after the decimation units of the evaluation value calculating units perform a process of selecting (decimating) a plurality of simultaneously input image data (in FIG. 8, two pieces of image data).

FIG. 9 is a block diagram illustrating the overall internal configuration of the evaluation value calculating units of the image pickup device in accordance with the related art. Of the evaluation value calculating units of the image pickup device, the configuration of the AF evaluation value calculating unit is shown in FIG. 9. When an AF evaluation value is generated, a first decimation unit first performs the decimation process on the image data output from the image capturing unit. More specifically, when the image pickup device includes a type of imager that simultaneously outputs pixel signals of two horizontally adjacent pixels, the first decimation unit performs the decimation process on image data in the horizontal direction. On the other hand, when the image pickup device includes a type of imager that simultaneously outputs pixel signals of two vertically adjacent pixels, the first decimation unit performs the decimation process on image data in the vertical direction.

Thereafter, the AF evaluation value calculating unit calculates (generates) an AF evaluation value of the image data obtained through the decimation process. More specifically, a Y generating unit of the AF evaluation value calculating unit first generates luminance signals (Y signals) based on the image data obtained through the decimation process. Then, a vertical AF evaluation value generating unit of the AF evaluation value calculating unit performs a vertical filtering process on the luminance signals generated by the Y generating unit and generates a vertical AF evaluation value by accumulating the luminance signals obtained through the filtering process. Simultaneously, a horizontal AF evaluation value generating unit of the AF evaluation value calculating unit performs a horizontal filtering process on the luminance signals generated by the Y generating unit and generates a horizontal AF evaluation value by accumulating the luminance signals obtained through the filtering process.

Accordingly, the image pickup device in accordance with the related art having the above-described configuration can calculate (generate) the AF evaluation value or the AE evaluation value with no increase in the circuit size of the evaluation value calculating units, even when image data corresponding to the pixel signals of a plurality of pixels is simultaneously input to the evaluation value calculating units.

However, since the evaluation value calculating units of the image pickup device in accordance with the related art disclosed in Japanese Unexamined Patent Application, First Publication No. 2008-005048 calculate the evaluation values after the decimation process, there is a problem that the accuracy of the generated evaluation values may deteriorate depending on a method for the decimation process.

In particular, since the AF evaluation value calculating unit shown in FIG. 9 calculates the evaluation value based on vertical or horizontal frequency components included in the image data, the accuracy of the evaluation value may be different between the simultaneously generated vertical AF evaluation value and horizontal AF evaluation value. More specifically, when the image pickup device includes a type of imager that simultaneously outputs pixel signals of two horizontally adjacent pixels, the first decimation unit performs the decimation process on image data in the horizontal direction. Therefore, the accuracy of the vertical AF evaluation value calculated based on the vertical frequency components does not deteriorate, but the accuracy of the horizontal AF evaluation value calculated based on the horizontal frequency components may deteriorate.

On the other hand, when the image pickup device includes a type of imager that simultaneously outputs pixel signals of two vertically adjacent pixels, the first decimation unit performs the decimation process on image data in the vertical direction. Therefore, the accuracy of the horizontal AF evaluation value calculated based on the horizontal frequency components does not deteriorate, but the accuracy of the vertical AF evaluation value calculated based on the vertical frequency components may deteriorate.

In the method of performing the decimation process on the image data in a fixed manner in accordance with the related art, the accuracy of the evaluation value may sometimes deteriorate depending on the output methods of outputting the pixel signals output by the imager of the image pickup device. Since the deterioration in the accuracy of the evaluation values also results in deteriorating the performance of the image pickup device, it is preferable for the accuracy of the evaluation values not to deteriorate.

A method of calculating the evaluation values without performing the decimation process can be considered as a method of preventing the accuracy of the evaluation values from deteriorating. In this method, the accuracy of the evaluation values can be improved compared to the method in accordance with the related art, but times necessary to calculate the evaluation values may be lengthened. Accordingly, a method of equalizing the times necessary to calculate the evaluation values by increasing the operation speed of the evaluation value calculating units can be considered. In this method, however, the power consumption of the evaluation value calculating units may increase, since the operation speed of the evaluation value calculating units is required to increase. Thus, the method of calculating the evaluation values without performing the decimation process by increasing the operation speed of the evaluation value calculating units is not necessarily an optimum method of preventing the accuracy of the evaluation values from deteriorating.

SUMMARY

According to an aspect of the invention, there are provided an image pickup device and an evaluation value generating device capable of generating an evaluation value without deterioration in accuracy of the evaluation value, even when there is a difference between output methods of outputting pixel signals from a solid-state image pickup device.

An image pickup device may include: an image capturing unit that includes a solid-state image pickup device having a plurality of pixels arrayed in a matrix form, the image capturing unit sequentially outputting a plurality of image capturing signals each of which corresponds to one of a plurality of pixel signals output from the solid-state image pickup device; and an evaluation value generating unit to which the plurality of image capturing signals output from the image capturing unit are sequentially input, the evaluation value generating unit generating an evaluation value based on the input image capturing signals. The evaluation value generating unit may include: a horizontal decimation unit that performs a horizontal decimation process of decimating the sequentially input image capturing signals in a row direction of the pixels arrayed in the solid-state image pickup device, the horizontal decimation unit sequentially outputting the image capturing signals obtained through the horizontal decimation process; a vertical decimation unit that performs a vertical decimation process of decimating the sequentially input image capturing signals in a column direction of the pixels arrayed in the solid-state image pickup device, the vertical decimation unit sequentially outputting the image capturing signals obtained through the vertical decimation process; a vertical evaluation value generating unit that includes a vertical filtering unit extracting column-direction components of the pixels arrayed in the solid-state image pickup device from the sequentially input image capturing signals, the vertical evaluation value generating unit generating a column-direction evaluation value based on signals obtained through a filtering process performed by the vertical filtering unit; and a horizontal evaluation value generating unit that includes a horizontal filtering unit extracting row-direction components of the pixels arrayed in the solid-state image pickup device from the sequentially input image capturing signals, the horizontal evaluation value generating unit generating a row-direction evaluation value based on signals obtained through a filtering process performed by the horizontal filtering unit. The evaluation value generating unit may sequentially input signals corresponding to the plurality of image capturing signals sequentially output from the image capturing unit as input signals of the horizontal and vertical decimation units. The evaluation value generating unit may sequentially input the image capturing signals obtained through the decimation process performed in the row direction by the horizontal decimation unit as input signals of the vertical evaluation value generating unit. The evaluation value generating unit may sequentially input the image capturing signals obtained through the decimation process performed in the column direction by the vertical decimation unit as input signals of the horizontal evaluation value generating unit.

The evaluation value generating unit may further include: a signal processing unit which performs image processing on sequentially input image signals and sequentially outputs signals generated through the signal processing. The evaluation value generating unit may sequentially input the plurality of image capturing signals sequentially output from the image capturing unit as the image signals input to the signal processing unit. The evaluation value generating unit may sequentially input the signals processed by the signal processing unit as the input signals of the horizontal and vertical decimation units.

The signal processing unit may perform signal processing to generate luminance signals based on the plurality of input image capturing signals. The evaluation value generating unit may sequentially input the luminance signals generated by the signal processing unit as the input signals of the horizontal and vertical decimation units.

The evaluation value generating unit may sequentially input the plurality of image capturing signals sequentially output from the image capturing unit as the input signals of the horizontal and vertical decimation units.

When the image capturing unit simultaneously outputs the image capturing signals of two pixels that are adjacent in the row direction of the pixels arrayed in the solid-state image pickup device and each of which corresponds to one of the pixel signals of the two pixels that are adjacent in the row direction in sequence from corresponding output terminals, the image capturing signals of the two pixels in the row direction which are simultaneously output from the image capturing unit are input sequentially to the evaluation value generating unit via corresponding input terminals, and an evaluation value is generated based on the input image capturing signals of the two pixels in the row direction, the horizontal decimation unit may output the image capturing signal input via one of the input terminals among the signals each of which is input via the input terminals as the signal obtained through the decimation process performed in the row direction, and the vertical decimation unit may not output all of the signals each of which is input via the input terminals in a row in which the input signals are decimated out, and outputs the signals rearranged from all of the image capturing signals each of which is input from the input terminals as the signals obtained through the decimation process performed in the column direction in a row in which the input signals are not decimated out.

When the image capturing unit simultaneously outputs the image capturing signals of two pixels that are adjacent in the column direction of the pixels arrayed in the solid-state image pickup device and each of which corresponds to the pixel signals of the two pixels that are adjacent in the column direction in sequence from output terminals, the image capturing signals of the two pixels in the column direction which are simultaneously output from the image capturing unit are input sequentially to the evaluation value generating unit via input terminals, and an evaluation value is generated based on the input image capturing signals of the two pixels in the column direction, the horizontal decimation unit may not output the signals of a column input from the input terminals and subjected to the decimation process and sequentially outputs the signals of a column each of which is input from the input terminals and not subjected to the decimation process as the signal obtained through the decimation process performed in the row direction in order of the input terminals, and the vertical decimation unit may output the signal input via one of the input terminals among the signals each of which is input via the input terminals as the signal obtained through the decimation process performed in the column direction.

An evaluation value generating device may generate an evaluation value based on a plurality of image capturing signals sequentially input from an image capturing unit that includes a solid-state image pickup device having a plurality of pixels arrayed in a matrix form and sequentially output the plurality of image capturing signals each of which corresponds to a plurality of pixel signals output from the solid-state image pickup device. The evaluation value generating device may include: a horizontal decimation unit that performs a horizontal decimation process of decimating the sequentially input image capturing signals in a row direction of the pixels arrayed in the solid-state image pickup device, the horizontal decimation unit sequentially outputting the image capturing signals obtained through the horizontal decimation process; a vertical decimation unit that performs a vertical decimation process of decimating the sequentially input image capturing signals in a column direction of the pixels arrayed in the solid-state image pickup device, the vertical decimation unit sequentially outputting the image capturing signals obtained through the vertical decimation process; a vertical evaluation value generating unit that includes a vertical filtering unit extracting column-direction components of the pixels arrayed in the solid-state image pickup device from the sequentially input image capturing signals, the vertical evaluation value generating unit generating a column-direction evaluation value based on signals obtained through a filtering process performed by the vertical filtering unit; and a horizontal evaluation value generating unit that includes a horizontal filtering unit extracting row-direction components of the pixels arrayed in the solid-state image pickup device from the sequentially input image capturing signals, the horizontal evaluation value generating unit generating a row-direction evaluation value based on signals obtained through a filtering process performed by the horizontal filtering unit. The evaluation value generating device may sequentially input signals corresponding to the plurality of image capturing signals sequentially output from the image capturing unit as input signals of the horizontal and vertical decimation units. The evaluation value generating device may sequentially input the image capturing signals obtained through the decimation process performed in the row direction by the horizontal decimation unit as input signals of the vertical evaluation value generating unit. The evaluation value generating device may sequentially input the image capturing signals obtained through the decimation process performed in the column direction by the vertical decimation unit as input signals of the horizontal evaluation value generating unit.

According to the aspects of the invention, the evaluation value can be generated without deterioration in the accuracy of the evaluation value, even when there is a difference between the output methods of outputting the pixel signals from the solid-state image pickup device.

BRIEF DESCRIPTION OF THE DRAWINGS

The above features and advantages of the present invention will be more apparent from the following description of certain preferred embodiments taken in conjunction with the accompanying drawings, in which:

FIG. 2 is a diagram illustrating an example of a pixel array in a solid-state image pickup device included in the image pickup device in accordance with a first preferred embodiment of the present invention;

FIGS. 3A and 3B are diagrams illustrating a method of generating a luminance signal by a Y generating unit of an AF evaluation value calculating unit of the image pickup device in accordance with the first preferred embodiment of the present invention;

FIG. 9 is a block diagram illustrating an overall internal configuration of evaluation value calculating units of the image pickup device in accordance with the related art.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
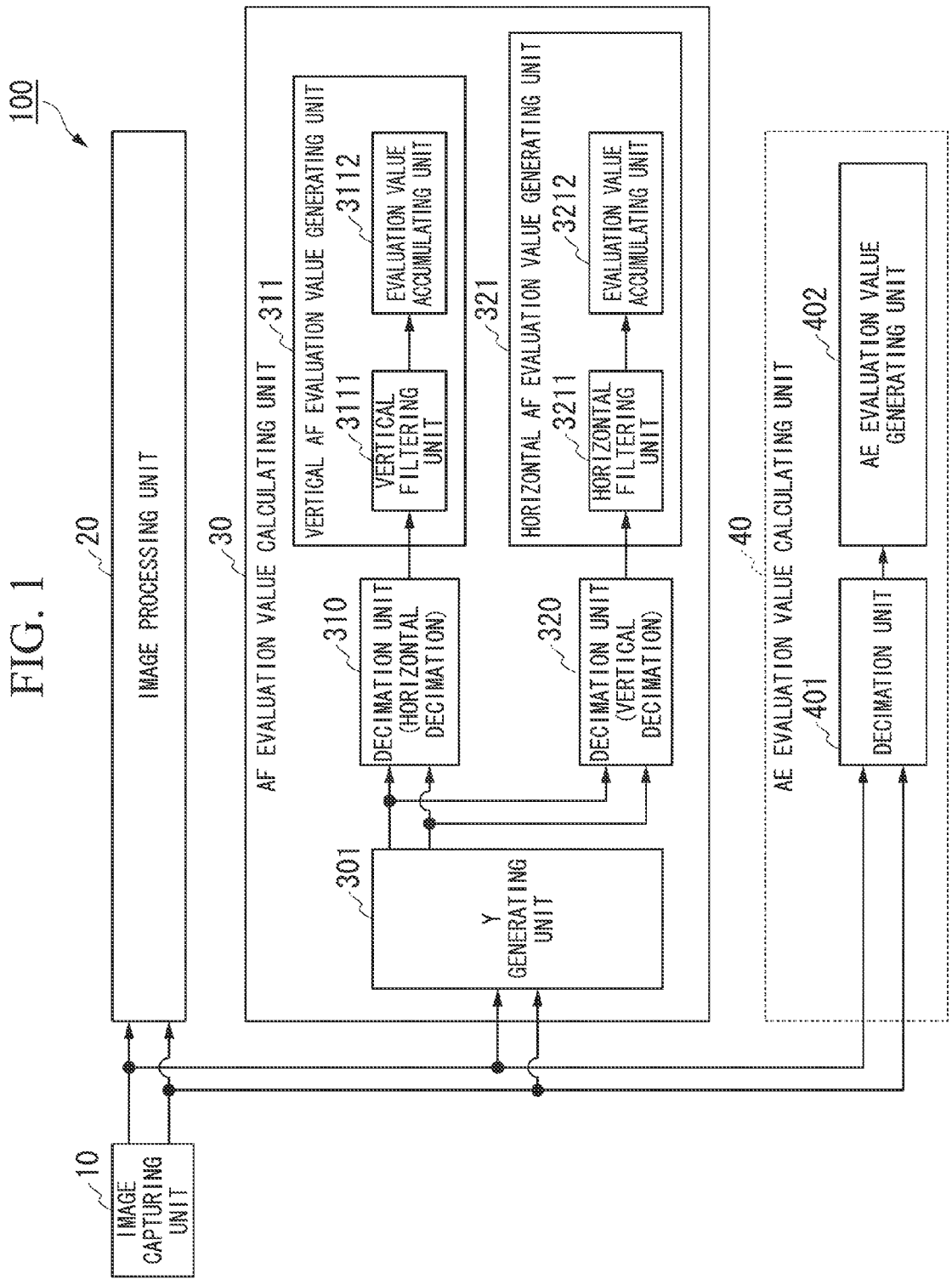
FIG. 1 is a block diagram illustrating an overall configuration of an image pickup device in accordance with a first preferred embodiment of the present invention.

Hereinafter, a first preferred embodiment of the present invention will be described with reference to the drawings. FIG. 1 is a block diagram illustrating the overall configuration of an image pickup device in accordance with the first preferred embodiment of the present invention. An image pickup device 100 shown in FIG. 1 includes an image capturing unit 10, an image processing unit 20, an AF evaluation value calculating unit 30, a decimation unit 401, and an AE evaluation value generating unit 402. In the image pickup device 100, the decimation unit 401 and the AE evaluation value generating unit 402 form an AE evaluation value calculating unit 40.

The image capturing unit 10 is configured of a lens, a solid-state image pickup device (imager), or the like. The image capturing unit 10 exposes an optical image of a subject formed on the imager through the lens under the control of a control unit (not shown). The image capturing unit 10 converts a pixel signal (analog signal) corresponding to the optical image of the subject exposed by the imager into a digital value and outputs the converted digital value to the image capturing processing unit 20, the AF evaluation value calculating unit 30, and the decimation unit 401 of the AE evaluation value calculating unit 40.

Figure 2:
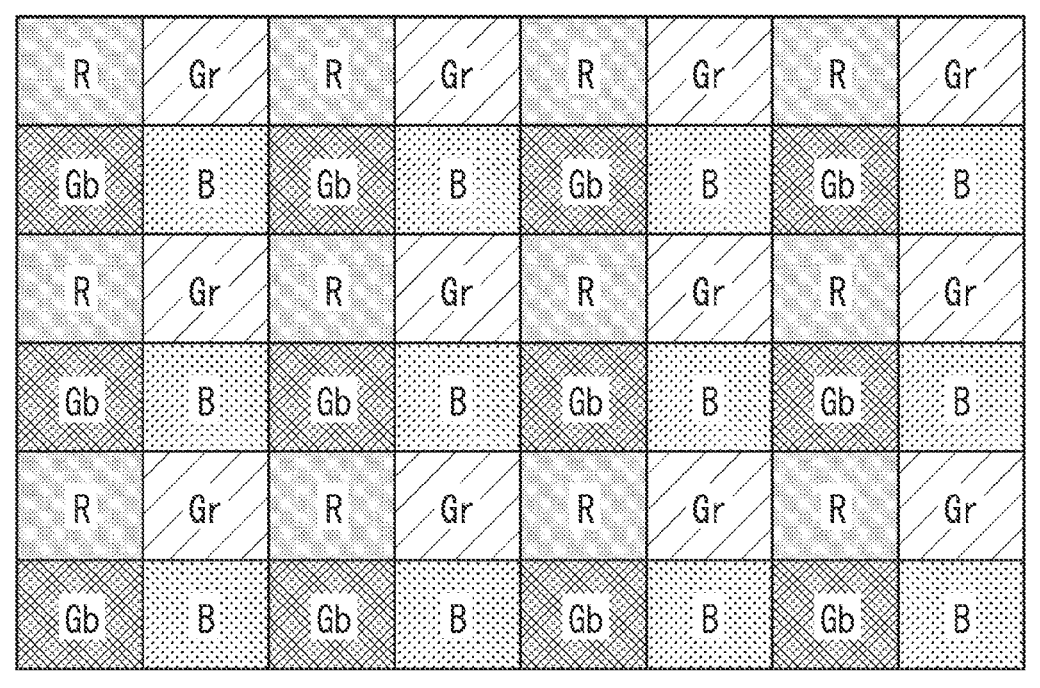

In the image pickup device 100 in accordance with the first preferred embodiment, the image capturing unit 10 includes the imager that simultaneously outputs pixel signals of two horizontally (in a row direction) adjacent pixels adjacent and has a Bayer array shown in FIG. 2. FIG. 2 is a diagram illustrating an example of the imager in which pixels are arrayed in six rows by eight columns. When the imager shown in FIG. 2 simultaneously outputs the pixel signals of two horizontally (in the row direction) adjacent pixels, the imager first simultaneously outputs the pixel signal of an R pixel from one channel and the pixel signal of a Gr pixel adjacent to the R pixel in the horizontal direction (row direction) from the other channel. At the subsequent output timing, the imager simultaneously outputs the pixel signal of a Gb pixel from one channel and the pixel signal of a B pixel adjacent to the Gb pixel in the horizontal direction (row direction) from the other channel. Thus, the imager of the image capturing unit 10 simultaneously outputs the pixel signals of two respective horizontally (in the row direction) adjacent pixels in sequence. Then, the image capturing unit 10 sequentially outputs the digital values (hereinafter referred to as "image data") of image capturing signals corresponding to the pixel signals output from the channels of the imager from two output channels (ch 1 and ch 2).

The image capturing unit 10 outputs a signal (not shown) indicating an output timing of the image data to the image processing unit 20, the AF evaluation value calculating unit 30, and the decimation unit 401. The output timing of the image data corresponding to the pixel signal output by the imager of the image capturing unit 10 will be described later.

The image capturing unit 10 may further include a preprocessing unit that performs predetermined image processing (preprocessing) such as a correlated double sampling (CDS) process of suppressing a noise component of a pixel signal output from the imager.

The image processing unit 20 performs various kinds of image processing in the image pickup device 100 on the image data input from the image capturing unit 10 under the control of the control unit (not shown). The image processing unit 20 outputs data obtained through the image processing to the corresponding constituent elements of the image pickup device 100. For example, the image processing unit 20 writes the image on a dynamic random access memory (DRAM) of the image pickup device 100 through a direct memory access interface (DMAIF) unit. Since the image processing unit 20 is the same as an image processing unit in accordance with the related art configured to correspond to a type of imager that simultaneously outputs pixel signals of two respective horizontally (in the row direction) adjacent pixels in sequence, the detailed description thereof will not be repeated.

The AE evaluation value calculating unit 40 calculates (generates) an AE evaluation value by integrating the image data of each color (R, Gr, Gb, and B in the imager having the Bayer array shown in FIG. 2) input from the image capturing unit 10 under the control of the control unit (not shown). The AE evaluation value calculating unit 40 writes the generated AE evaluation value on the DRAM of the image pickup device 100 through, for example, the DMAIF unit. Since the decimation unit 401 and the AE evaluation value generating unit 402 of the AE evaluation value calculating unit 40 are the same as the AE evaluation value calculating unit of the related art (for example, a second decimation unit and an AE evaluation value generating unit shown in FIG. 9), the detailed description thereof will not be repeated.

The AF evaluation value calculating unit 30 generates a luminance signal (Y signal) based on the image data input from the image capturing unit 10 and calculates (generates) an AF evaluation value based on the generated Y signal under the control of the control unit (not shown). The AF evaluation value calculating unit 30 writes the generated AF evaluation value on the DRAM of the image pickup device 100 through, for example, the DMAIF unit. The AF evaluation value calculating unit 30 includes a Y generating unit 301, a decimation unit 310, a vertical AF evaluation value generating unit 311, a decimation unit 320, and a horizontal AF evaluation value generating unit 321.

Figures 3A, 3B:
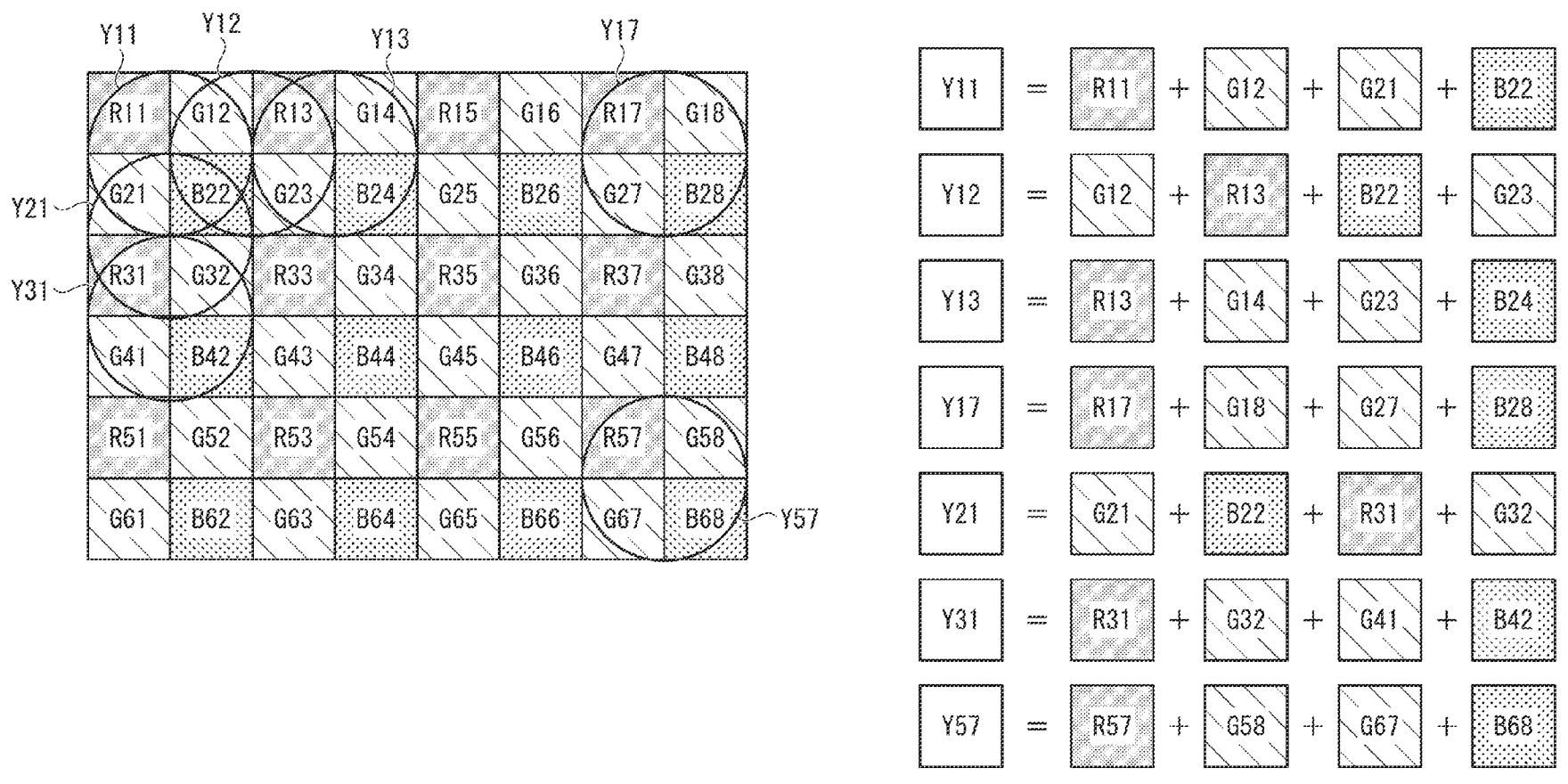

The Y generating unit 301 is generates a luminance signal (Y signal) based on the image data input from the image capturing unit 10. Hereinafter, a method of generating the Y signal by the Y generating unit 301 will be described. FIGS. 3A and 3B are diagrams illustrating the method of generating the luminance signal (Y signal) by the Y generating unit 301 of the AF evaluation value calculating unit 30 of the image pickup device 100 in accordance with the first preferred embodiment of the present invention.

FIG. 3A shows a positional relation between the pixels of the imager having the Bayer array shown in FIG. 2 and the pixels when the Y generating unit 301 generates the Y signals. FIG. 3B shows an example of calculation when the Y generating unit 301 generates the Y signals. In FIGS. 3A and 3B, row and column numbers are suffixed after the colors of the pixels to distinguish the pixels arrayed on the imager from each other. For example, "G25" denotes a Gb pixel located in the second row and the fifth column.

The Y generating unit 301 generates one Y signal using four adjacent pixels arrayed on the imager, as in the pixels within ranges encircled by circles in FIG. 3A. More specifically, the Y generating unit 301 generates the digital value (hereinafter referred to as "Y signal data") of the Y signal by adding the image data of the R, Gr, Gb, and B pixels within a range encircled by a circle shown in FIG. 3A. For example, as shown in FIG. 3B, each Y signal data is generated by adding the image data of the pixels within a range encircled by a circle shown in FIG. 3A, as in "Y11=R11+G12+G21+B22" and "Y12=G12+R13+B22+G23."

In FIGS. 3A and 3B, to distinguish among the generated Y signal data, the row and column numbers of the first pixel in the image data of each color used to generate the Y signal data are suffixed after the Y signal data. For example, since the Y signal Y11 described above is generated using the image data of the R pixel R11 in the first row and the first column, the Gr pixel G12 at the first row and the second column, the Gb pixel G21 at the second row and the first column, and the B pixel B22 at the second row and the second column, the row and column numbers of the initial R pixel R11, that is, "11," is suffixed after the Y signal data and "Y11" is thus marked.

The method of adding the image data of the pixels (R, Gr, Gb, and B pixels) on the imager described above has been described as the method of generating each Y signal by the Y generating unit 301 to facilitate the description. However, the method of generating each Y signal by the Y generating unit 301 is not limited to the above-described method. For example, each Y signal may be generated by applying a general conversion equation such as "Y=0.299R+0.587G+ 0.114B" to the image data of the each color within a range in a circle of FIG. 3A. Here, "G" in the general conversion equation described above is data of an addition average of, for example, "G12" and "G21."

The Y generating unit 301 outputs each Y signal data generated based on the image data input from the image capturing unit 10 to the decimation units 310 and 320. Further, the processing timing at which the Y generating unit 301 generates the Y signal data will be described later.

The decimation unit 310 decimates the Y signal data input from the Y generating unit 301 in the horizontal direction (the row direction of the imager), as image data to be input, and outputs the decimated Y signal data (hereinafter referred to as "horizontally decimated Y signal data"), as image data to be output, to the vertical AF evaluation value generating unit 311.

The decimation unit 320 decimates the Y signal data input from the Y generating unit 301 in the vertical direction (the column direction of the imager), as image data to be input, and outputs the decimated Y signal data (hereinafter referred to as "vertically decimated Y signal data"), as image data to be output, to the horizontal AF evaluation value generating unit 321.

Figure 4:
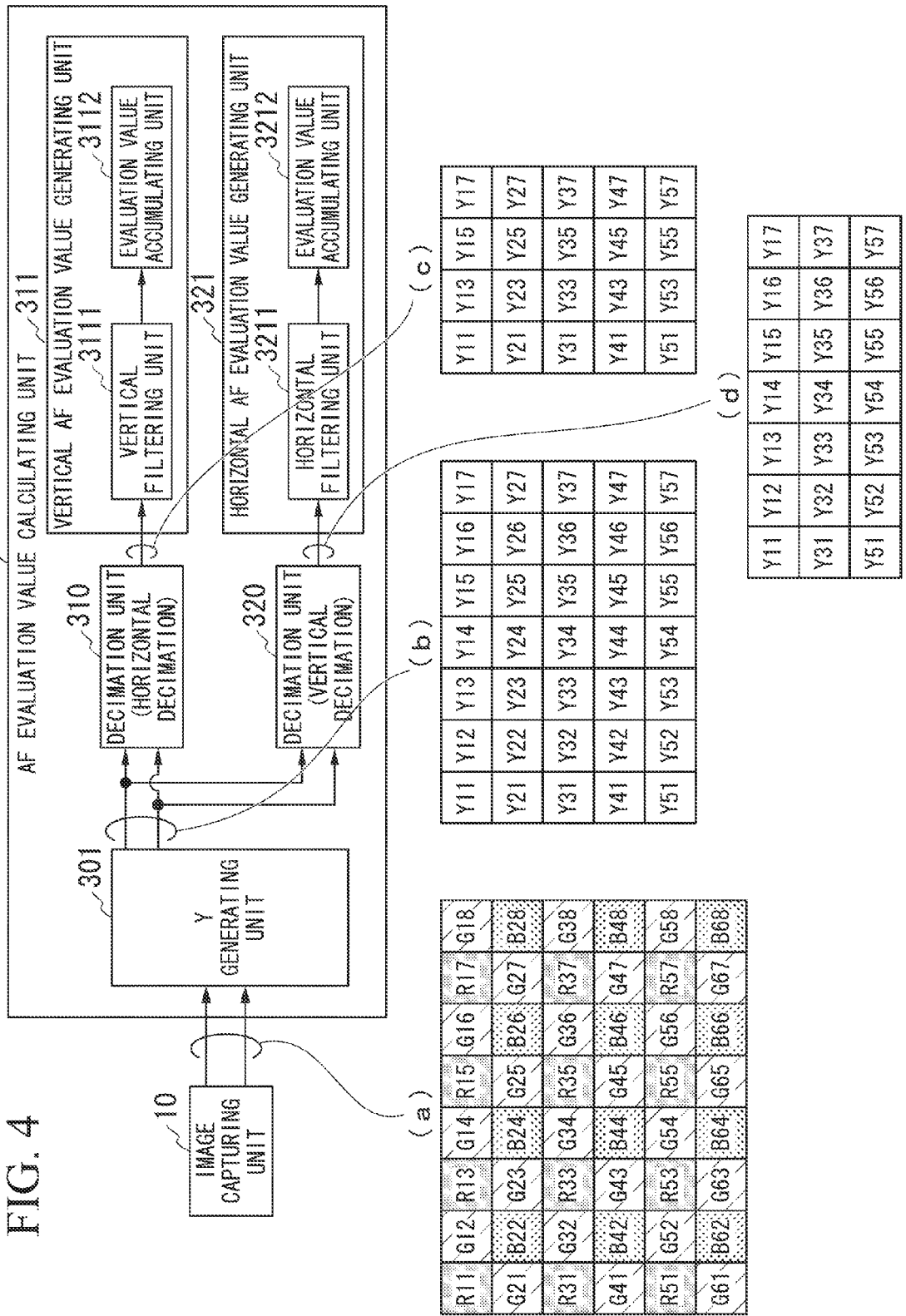
FIG. 4 is a diagram schematically illustrating an example of data arrays in processing steps of the image pickup device in accordance with the first preferred embodiment of the present invention.

Hereinafter, methods of decimating the Y signal data by the decimation units 310 and 320 will be described. FIG. 4 is a diagram schematically illustrating an example of data arrays in processing steps of the image pickup device 100 in accordance with the first preferred embodiment of the present invention. Here, a of FIG. 4 shows the image data input from the image capturing unit 10 to the Y generating unit 301 of the AF evaluation value calculating unit 30. Here, b of FIG. 4 shows the Y signal data generated by the Y generating unit 301. Here, c of FIG. 4 shows the horizontally decimated Y signal data when the decimation unit 310 performs the decimation process in the horizontal direction. Here, d of FIG. 4 shows the vertically decimated Y signal data when the decimation unit 320 performs the decimation process in the vertical direction.

The decimation unit 310 performs the decimation process of decimating the Y signal data continuous in the horizontal direction among the Y signal data input from the Y generating unit 301 and outputs the horizontally decimated Y signal data obtained through the decimation process to the vertical AF evaluation value generating unit 311. In c of FIG. 4, the decimation unit 310 performs the decimation process of decimating the even Y signal data in the horizontal direction among the input Y signal data (see b of FIG. 4) and outputs the odd Y signal data as the horizontally decimated Y signal data. That is, the decimation unit 310 decimates the Y signal data in the even columns among the Y signal data shown in b of FIG. 4 and outputs the horizontally decimated Y signal data, which is the Y signal data in the odd columns, to the vertical AF evaluation value generating unit 311. The processing timing at which the decimation unit 310 performs the decimation process will be described later.

The decimation unit 320 performs the decimation process of decimating the Y signal data continuous in the vertical direction among the Y signal data input from the Y generating unit 301 and outputs the vertically decimated Y signal data obtained through the decimation process to the horizontal AF evaluation value generating unit 321. In d of FIG. 4, the decimation unit 320 performs the decimation process of decimating the vertically even Y signal data among the input Y signal data (see b of FIG. 4) and outputs the odd Y signal data as the vertically decimated Y signal data. That is, the decimation unit 320 decimates the Y signal data in the even rows among the Y signal data shown in b of FIG. 4 and outputs the vertically decimated Y signal data, which is the Y signal data in the odd rows, to the horizontal AF evaluation value generating unit 321. The processing timing at which the decimation unit 320 performs the decimation process will be described later.

The vertical AF evaluation value generating unit 311 calculates (generates) an AF evaluation value (hereinafter referred to as a "vertical AF evaluation value") based on vertical frequency components included in the horizontally decimated Y signal data input from the decimation unit 310. Then, the vertical AF evaluation value generating unit 311 writes the generated vertical AF evaluation value on the DRAM of the image pickup device 100 through, for example, the DMAIF unit.

The vertical AF evaluation value generating unit 311 includes a vertical filtering unit 3111 that performs a filtering process of extracting the vertical frequency components included in the horizontally decimated Y signal data and an evaluation value accumulating unit 3112 that generates a vertical AF evaluation value obtained by accumulating (integrating) the horizontally decimated Y signal data obtained through the vertical filtering process performed by the vertical filtering unit 3111, that is, the vertical frequency components included in the horizontally decimated Y signal data. Since the vertical filtering unit 3111 and the evaluation value accumulating unit 3112 of the vertical AF evaluation value generating unit 311 are the same as, for example, a vertical filtering unit and an evaluation value accumulating unit of the AF evaluation value calculating unit in accordance with the related art shown in FIG. 9, the detailed description thereof will not be repeated.

The horizontal AF evaluation value generating unit 321 calculates (generates) an AF evaluation value (hereinafter referred to as a "horizontal AF evaluation value") based on horizontal frequency components included in the horizontally decimated Y signal data input from the decimation unit 320. Then, the horizontal AF evaluation value generating unit 321 writes the generated horizontal AF evaluation value on the DRAM of the image pickup device 100 through, for example, the DMAIF unit.

The horizontal AF evaluation value generating unit 321 includes a horizontal filtering unit 3211 that performs a filtering process of extracting the horizontal frequency components included in the vertically decimated Y signal data and an evaluation value accumulating unit 3212 that generates a horizontal AF evaluation value obtained by accumulating (integrating) the vertically decimated Y signal data obtained through the horizontal filtering process performed by the horizontal filtering unit 3211, that is, the horizontal frequency components included in the vertically decimated Y signal data. Since the horizontal filtering unit 3211 and the evaluation value accumulating unit 3212 of the horizontal AF evaluation value generating unit 321 are the same as, for example, a horizontal filtering unit and an evaluation value accumulating unit of the AF evaluation value calculating unit in accordance with the related art shown in FIG. 9, the detailed description thereof will not be repeated.

Figure 5:
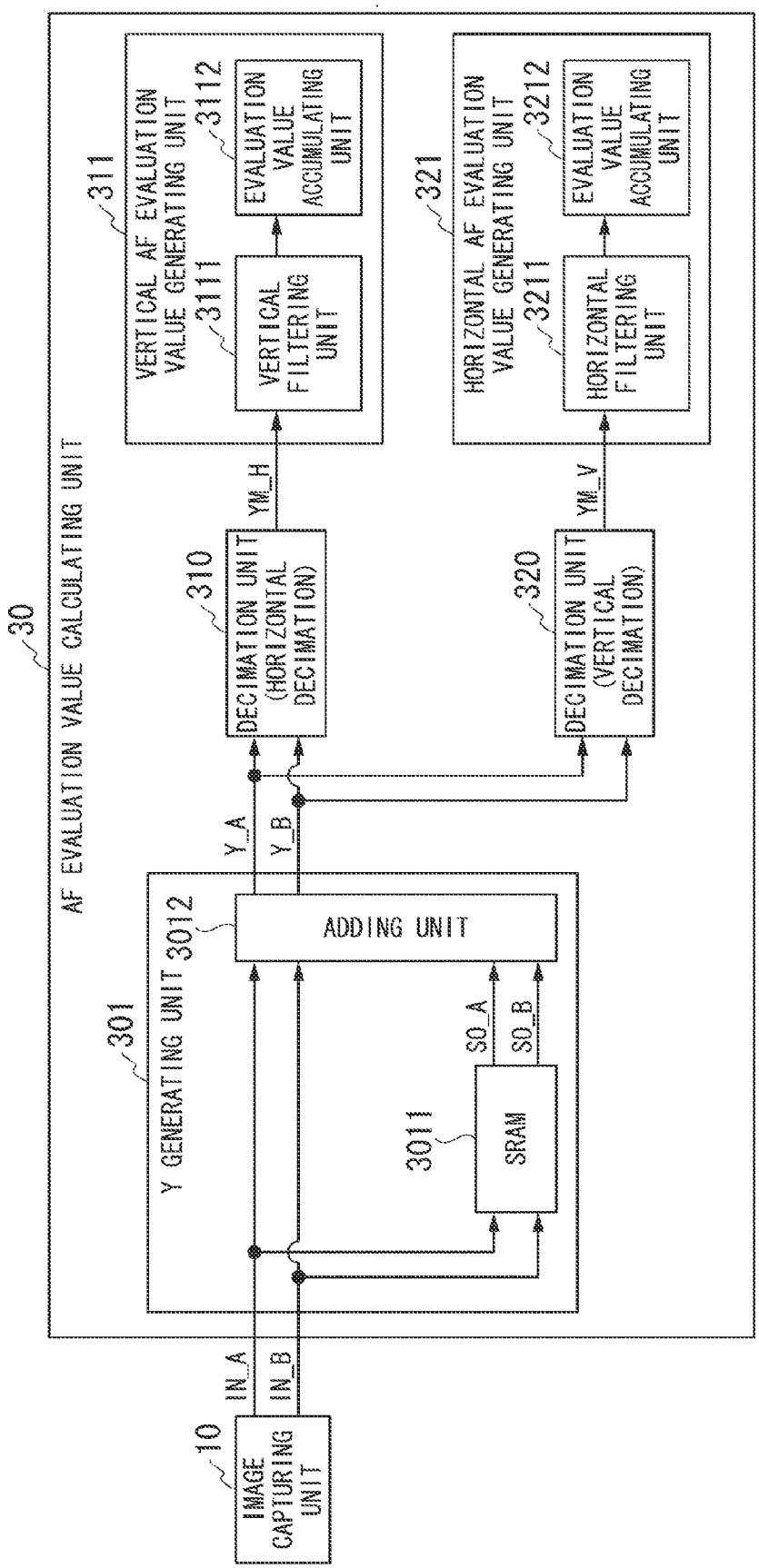
FIG. 5 is a block diagram illustrating a configuration of the AF evaluation value calculating unit of the image pickup device in accordance with the first preferred embodiment of the present invention.

Next, the configuration and a processing timing of the AF evaluation value calculating unit 30 of the image pickup device 100 in accordance with the first preferred embodiment will be described in more detail. First, the configuration of the AF evaluation value calculating unit 30 will be described. FIG. 5 is a block diagram illustrating the configuration of the AF evaluation value calculating unit 30 of the image pickup device 100 in accordance with the first preferred embodiment of the present invention. As described above, the AF evaluation value calculating unit 30 generates the Y signal data based on the image data input from the image capturing unit 10 and calculates (generates) the AF evaluation value based on the generated Y signal data.

In the first preferred embodiment, the imager has a Bayer array in which pixel signals of two horizontally (in the row direction) adjacent pixels are simultaneously output. Therefore, the image capturing unit 10 simultaneously outputs the image data corresponding to two horizontally (in the row direction) adjacent pixels included in one row (line) on the imager to the Y generating unit 301 using a one-time image capturing synchronization signal HD (not shown) indicating an output timing of the image data. In FIG. 5, the image data corresponding to two pixels is simultaneously output to two signal lines (IN_A and IN_B) of the image capturing unit 10. The Y generating unit 301 includes an SRAM 3011 and an adding unit 3012.

The SRAM 3011 is a memory unit that holds the image data input via the signal lines IN_A and IN_B of the image capturing unit 10 by one line, that is, up to the timing of the subsequent image capturing synchronization signal HD. The SRAM 3011 simultaneously outputs the image data delayed by one line to the adding unit 3012 via two signal lines (SO_A and SO_B). The timing of the image data delayed by the SRAM 3011 will be described as the processing timing at which the Y generating unit 301 generates the Y signal data.

The adding unit 3012 generates the Y signal data by adding the image data of four adjacent pixels in the imager, as shown in FIG. 3B, based on the image data delayed by one line and input via the signal lines SO_A and SO_B of the SRAM 3011 and the current image data input via the signal lines IN_A and IN_B of the image capturing unit 10. The adding unit 3012 simultaneously outputs the generated Y signal data to the decimation units 310 and 320 via two signal lines (Y_A and Y_B). The processing timing at which the adding unit 3012 generates the Y signal data will be described as the processing timing at which the Y generating unit 301 generates the Y signal data.

The decimation unit 310 generates the horizontally decimated Y signal data obtained through the horizontal decimation process of decimating the Y signal data input via the signal lines Y_A and Y_B of the adding unit 3012 of the Y generating unit 301. Then, the decimation unit 310 outputs the generated horizontally decimated Y signal data to the vertical AF evaluation value generating unit 311 via a signal line YM_H.

The decimation unit 320 generates the vertically decimated Y signal data obtained through the vertical decimation process of decimating the Y signal data input via the signal lines Y_A and Y_B of the adding unit 3012 of the Y generating unit 301. Then, the decimation unit 320 outputs the generated horizontally decimated Y signal data to the vertical AF evaluation value generating unit 321 via a signal line YM_V.

The vertical AF evaluation value generating unit 311 performs the vertical filtering process on the horizontally decimated Y signal data input via the signal line YM_H of the decimation unit 310 to generate the vertical AF evaluation value by integrating the vertical frequency components included in the horizontally decimated Y signal data.

The horizontal AF evaluation value generating unit 321 performs the horizontal filtering process on the vertically decimated Y signal data input via the signal line YM_V of the decimation unit 320 to generate the horizontal AF evaluation value by integrating the horizontal frequency components included in the vertically decimated Y signal data.

Figure 6:
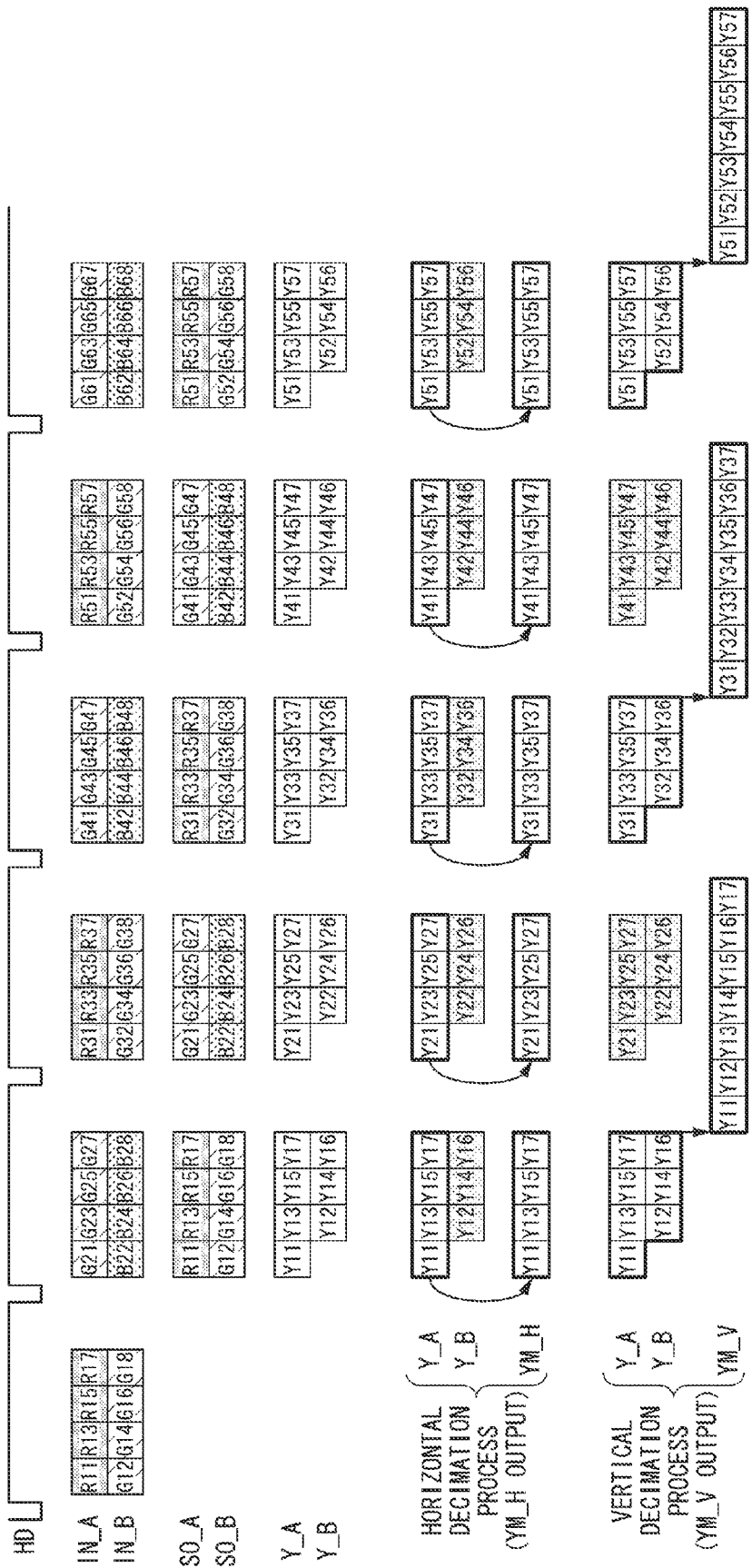
FIG. 6 is a timing chart illustrating an example of a processing timing of the AF evaluation value calculating unit of the image pickup device in accordance with the first preferred embodiment of the present invention.

Next, the processing timing of the AF evaluation value calculating unit 30 will be described. FIG. 6 is a timing chart illustrating an example of the processing timing of the AF evaluation value calculating unit 30 of the image pickup device 100 in accordance with the first preferred embodiment of the present invention. FIG. 6 shows the processing timing and data input via each signal line in the AF evaluation value calculating unit 30 when the image data is input to the AF evaluation value calculating unit 30, when the imager shown in FIG. 2 simultaneously outputs the pixel signals of two horizontally (in the row direction) adjacent pixels.

First, a process of generating the Y signal data based on the image data output from the image capturing unit 10 will be described. During the period of a first image capturing synchronization signal HD, the image capturing unit 10 first sequentially outputs image data (R11, R13, R15, and R17) of R pixels of the first line arrayed on the imager via the signal line IN_A. Thus, the image data R11, R13, R15, and R17 of the R pixels is input sequentially to the Y generating unit 301. At the same time, the image capturing unit 10 sequentially outputs image data (G12, G14, G16, and G18) of Gr pixels of the first line arrayed on the imager via the signal line IN_B. Thus, the image data G12, G14, G16, and G18 of the Gr pixels is input sequentially to the Y generating unit 301.

At this time, the SRAM 3011 of the Y generating unit 301 holds the image data (the image data R11, R13, R15, and R17 of the R pixels and the image data G12, G14, G16, and G18 of the Gr pixels) sequentially input via the signal lines IN_A and IN_B. During the period of the first image capturing synchronization signal HD, the adding unit 3012 of the Y generating unit 301 does not generate the Y signal data.

During the period of a second image capturing synchronization signal HD, the image capturing unit 10 sequentially outputs image data (G21, G23, G25, and G27) of the Gb pixels of the second line arrayed on the imager via the signal line IN_A. Thus, the image data G21, G23, G25, and G27 of the Gb pixels is input sequentially to the Y generating unit 301. At the same time, the image capturing unit 10 sequentially outputs image data (B22, B24, B26, and B28) of the B pixels of the second line arrayed on the imager via the signal line IN_B. Thus, the image data B22, B24, B26, and B28 of the B pixels is input sequentially to the Y generating unit 301.

At this time, the SRAM 3011 of the Y generating unit 301 outputs the image data (the image data R11, R13, R15, and R17 of the R pixels and the image data G12, G14, G16, and G18 of the Gr pixels) held during the period of the first image capturing synchronization signal HD via the signal lines SO_A and SO_B. At the same time, the SRAM 3011 holds the image data (the image data G21, G23, G25, and G27 of the Gb pixels and the image data B22, B24, B26, and B28 of the B pixels) sequentially input via the signal lines IN_A and IN_B. Thus, as understood from FIG. 6, the image data corresponding to two lines used to generate the Y signals is input sequentially to the adding unit 3012 of the Y generating unit 301.

The adding unit 3012 of the Y generating unit 301 generates the Y signal data by adding the image data of four adjacent pixels among the image data input via the signal lines SO_A and SO_B during the period of the first image capturing synchronization signal HD and the image data input via the signal lines IN_A and IN_B during the period of the second image capturing synchronization signal HD (see FIG. 3B). Then, the adding unit 3012 outputs the generated Y signal data Y11, Y13, Y15, and Y17 via the signal line Y_A and outputs the generated Y signal data Y12, Y14, and Y16 via the signal Y_B. Thus, the Y signal data generated by the adding unit 3012 is input sequentially to the decimation units 310 and 320.

During the period of a third image capturing synchronization signal HD, the image capturing unit 10 sequentially outputs image data (R31, R33, R35, and R37) of the R pixels of the third line arrayed on the imager via the signal line IN_A. Thus, the image data R31, R33, R35, and R37 of the R pixels is input sequentially to the Y generating unit 301. At the same time, the image capturing unit 10 sequentially outputs image data (G32, G34, G36, and G38) of the Gr pixels of the third line arrayed on the imager via the signal line IN_B. Thus, the image data G32, G34, G36, and G38 of the Gr pixels is input sequentially to the Y generating unit 301.

At this time, the SRAM 3011 of the Y generating unit 301 outputs the image data (the image data G21, G23, G25, and G27 of the Gb pixels and the image data B22, B24, B26, and B28 of the B pixels) held during the period of the second image capturing synchronization signal HD via the signal lines SO_A and SO_B. At the same time, the SRAM 3011 holds the image data (the image data R31, R33, R35, and R37 of the R pixels and the image data G32, G34, G36, and G38 of the Gr pixels) sequentially input via the signal lines IN_A and IN_B. Thus, as understood from FIG. 6, the image data corresponding to subsequent two lines used to generate the Y signals is input sequentially to the adding unit 3012 of the Y generating unit 301.

The adding unit 3012 of the Y generating unit 301 generates the Y signal data by adding the image data of four adjacent pixels among the image data input via the signal lines SO_A and SO_B during the period of the second image capturing synchronization signal HD and the image data input via the signal lines IN_A and IN_B during the period of the third image capturing synchronization signal HD (see FIG. 3B). Then, the adding unit 3012 outputs the generated Y signal data Y21, Y23, Y25, and Y27 via the signal line Y_A and outputs the generated Y signal data Y22, Y24, and Y26 via the signal Y_B. Thus, the Y signal data generated by the adding unit 3012 is input sequentially to the decimation units 310 and 320.

Thereafter, the image capturing unit 10 repeatedly outputs the image data arrayed on the imager via the signal lines IN_A and IN_B in the same way for each image capturing synchronization signal HD. Then, the Y generating unit 301 repeatedly generates and outputs the Y signal data based on the image data held during the period of the previous image capturing synchronization signal HD and the image data input during the period of the current image capturing synchronization signal HD.

Thus, the image capturing unit 10 sequentially outputs the image data in accordance with the output method of the imager and the Y generating unit 301 sequentially generates the Y signal data based on the image data input from the image capturing unit 10.

Next, the horizontal decimation process of decimating the Y signal data output from the Y generating unit 301 will be described. The decimation unit 310 starts the horizontal decimation process when the Y signal data is input via the signal lines Y_A and Y_B from the Y generating unit 301 during the period of the second image capturing synchronization signal HD.

In the horizontal decimation process performed by the decimation unit 310, as shown in c of FIG. 4, the even Y signal data is decimated out in the horizontal direction among the input Y signal data, and thus only the odd Y signal data remains. Then, the odd Y signal data is sequentially output as the horizontally decimated Y signal data via the signal line YM_H. As understood from FIG. 6, during the period of the second image capturing synchronization signal HD, the odd Y signal data Y11, Y13, Y15, and Y17 is input to the decimation unit 310 via the signal line Y_A and the even Y signal data Y12, Y14, and Y16 is input to the decimation unit 310 via the signal line Y_B. Therefore, the decimation unit 310 sequentially outputs only the odd Y signal data Y11, Y13, Y15, and Y17 input via the signal line Y_A as the horizontally decimated Y signal data via the signal line YM_H.

Thus, the horizontally decimated Y signal data obtained through the horizontal decimation process performed by the decimation unit 310 is input sequentially to the vertical AF evaluation value generating unit 311. Then, the vertical AF evaluation value generating unit 311 generates the vertical AF evaluation value based on the horizontally decimated Y signal data.

Thereafter, the decimation unit 310 repeatedly outputs only the horizontally odd Y signal data input via the signal line Y_A as the horizontally decimated Y signal data via the signal line YM_H. Thus, the vertical AF evaluation value generating unit 311 repeatedly generates the vertical AF evaluation value.

Next, the vertical decimation process of decimating the Y signal data output from the Y generating unit 301 will be described. The decimation unit 320 starts the vertical decimation process when the Y signal data is input via the signal lines Y_A and Y_B from the Y generating unit 301 during the period of the second image capturing synchronization signal HD.

In the vertical decimation process performed by the decimation unit 320, as shown in d of FIG. 4, the vertically even Y signal data is decimated out among the input Y signal data, and thus only the odd Y signal data remains. Then, the odd Y signal data is sequentially output as the vertically decimated Y signal data via the signal line YM_V. As understood from FIG. 6, during the period of the second image capturing synchronization signal HD, the vertically odd Y signal data is input to the decimation unit 320 via the signal lines Y_A and Y_B. Therefore, the decimation unit 320 alternately outputs the Y signal data input via the signal line Y_A and the Y signal data input from the signal line Y_B to sequentially output the Y signal data as the vertically decimated Y signal data via the signal line YM_V. That is, the decimation unit 320 alternately outputs the Y signal data Y11, Y13, Y15, and Y17 input via the signal line Y_A and the Y signal data Y12, Y14, and Y16 input via the signal line Y_B to sequentially output the vertically decimated Y signal data obtained by changing the order of the Y signal data via the signal line YM_V.

As understood from FIG. 6, the Y signal data is input from the Y generating unit 301 to the decimation unit 320 via the signal lines Y_A and Y_B even during the period of the third image capturing synchronization signal HD. However, the Y signal data input during the period of the third image capturing synchronization signal HD is the vertically even Y signal data and are the Y signal data obtained through the decimation process performed by the decimation unit 320. Therefore, the decimation unit 320 does not output the Y signal data input via the signal line YM_V during the period of the third image capturing synchronization signal HD.

Thus, the vertically decimated Y signal data obtained through the vertical decimation process performed by the decimation unit 320 is sequentially input to the horizontal AF evaluation value generating unit 321. Then, the horizontal AF evaluation value generating unit 321 generates the horizontal AF evaluation value based on the vertically decimated Y signal data.

Thereafter, the decimation unit 320 repeatedly outputs the vertically odd Y signal data input via the signal lines Y_A and Y_B as the vertically decimated Y signal data via the signal line YM_V. Thus, the horizontal AF evaluation value generating unit 321 repeatedly generates the horizontal AF evaluation value.

According to the first preferred embodiment, as described above, the decimation unit 310 performs the horizontal decimation process on the input Y signal data. Then, the vertical AF evaluation value generating unit 311 generates the vertical AF evaluation value based on the vertical frequency components included in the horizontally decimated Y signal data obtained through the horizontal decimation process. Further, according to the first preferred embodiment, the decimation unit 320 performs the vertical decimation process on the input Y signal data. Then, the horizontal AF evaluation value generating unit 321 generates the horizontal AF evaluation value based on the horizontal frequency components included in the vertically decimated Y signal data obtained through the vertical decimation process. Thus, in the first preferred embodiment, the method of decimating the Y signal data is changed depending on the characteristics of the AF evaluation value generation units on the rear stage. Accordingly, the AF evaluation value generation units on the rear stage can generate the AF evaluation values without deterioration in the accuracy.

More specifically, the vertical filtering unit 3111 of the vertical AF evaluation value generating unit 311 extracts the vertical frequency components. Further, the horizontal filtering unit 3211 of the horizontal AF evaluation value generating unit 321 extracts the horizontal frequency components. Therefore, when the image pickup device 100 includes a type of imager that simultaneously outputs the pixel signals of two horizontally (in the row direction) adjacent pixels and the first decimation unit of the image pickup device in accordance with the related art shown in FIG. 9 performs a horizontal decimation process on the input image data, the accuracy of the horizontal AF evaluation value generated by the horizontal AF evaluation value generating unit 321 extracting the horizontal frequency components may deteriorate.

In the first preferred embodiment, the horizontal frequency components are not decimated out, since the Y signal data input to the horizontal AF evaluation value generating unit 321 is the vertically decimated Y signal data obtained through the vertical decimation process. That is, in the first preferred embodiment, the vertical decimation process performed by the decimation unit 320 is a decimation process performed in a direction which less affects the accuracy of the horizontal AF evaluation value generated by the horizontal AF evaluation value generating unit 321. Accordingly, the horizontal AF evaluation value generating unit 321 can generate the horizontal AF evaluation value without the deterioration in the accuracy.

In the first preferred embodiment, the Y signal data input to the vertical AF evaluation value generating unit 311 is the horizontally decimated Y signal data obtained through the horizontal decimation process. That is, since the Y signal data input to the vertical AF evaluation value generating unit 311 is the Y signal data obtained through the decimation process performed in a direction which less affects the accuracy of the vertical AF evaluation value, the vertical AF evaluation value generating unit 311 can also generate the vertical AF evaluation value without the deterioration in the accuracy.

Thus, in the first preferred embodiment, the Y signal data obtained through the decimation process performed in the directions which less affect the accuracy of the AF evaluation values generated by the AF evaluation value generating units is input to the AF evaluation value generating units. Accordingly, the AF evaluation value generating units can generate the AF evaluation values without a difference in the accuracy. In the first preferred embodiment, since the decimation process is performed on the input image data in one of the horizontal and vertical directions, it is not necessary to increase the operation speed of the AF evaluation value generating units and the power consumption can be prevented from increasing.

Second Preferred Embodiment

Next, a second preferred embodiment of the present invention will be described. An image pickup device in accordance with the second preferred embodiment is different from the image pickup device 100 in accordance with the first preferred embodiment in an image output method of the image capturing unit and a type of imager including an image capturing processing unit, an AF evaluation value calculating unit, and an AE evaluation value calculating unit. The remaining configuration of the image pickup device in accordance with the second preferred embodiment is the same as that of the image pickup device 100 in accordance with the first preferred embodiment. Accordingly, in the following description, the block diagram illustrating the overall configuration of the image pickup device in accordance with the second preferred embodiment is not shown. The overall configuration of the image pickup device in accordance with the second preferred embodiment will be described with reference to FIG. 1 illustrating the image pickup device 100 in accordance with the first preferred embodiment. The functions and operations different from the constituent elements of the image pickup device 100 shown in FIG. 1 will be described as the functions and operations of the constituent elements of the image pickup device in accordance with the second preferred embodiment.

In an image pickup device 100 in accordance with the second preferred embodiment, an image capturing unit 10 includes an imager that simultaneously outputs pixel signals of two vertically (in a column direction) adjacent pixels and has a Bayer array shown in FIG. 2. The image capturing unit 10 of the image pickup device 100 in accordance with the first preferred embodiment includes the imager that has the Bayer array to simultaneously output the pixel signals of two horizontally (in the row direction) adjacent pixels, but the image capturing unit 10 in accordance with the second preferred embodiment has the imager that has the Bayer array to simultaneously output the pixel signals of two vertically (in the column direction) adjacent pixels. Accordingly, the constituent elements of the image pickup device 100 in accordance with the second preferred embodiment are configured to correspond to the imager that has the Bayer array to simultaneously output the pixel signals of two vertically (in the column direction) adjacent pixels.

When the imager shown in FIG. 2 simultaneously outputs the pixel signals of two vertically (in the column direction) adjacent pixels, the imager simultaneously outputs the pixel signal of an R pixel from one channel and the pixel signal of a Gb pixel adjacent to the R pixel in the vertical direction (column direction) from the other channel. At the subsequent output timing, the imager simultaneously outputs the pixel signal of a Gr pixel from one channel and the pixel signal of a B pixel adjacent to the Gr pixel in the vertical direction (column direction) from the other channel. Thus, the imager of the image capturing unit 10 simultaneously outputs the pixel signals of two respective vertically (in the column direction) adjacent pixels in sequence. Then, the image capturing unit 10 sequentially outputs the image data having the digital values converted from the pixel signals (analog signals) corresponding to an optical image of a subject exposed by the imager from the channels of the imager from two output channels (ch 1 and ch 2).

The image capturing unit 10 outputs a signal (not shown) indicating an output timing of the image data to the image processing unit 20, the AF evaluation value calculating unit 30, and the decimation unit 401. The output timing of the image data corresponding to the pixel signal output by the imager of the image capturing unit 10 will be described later.

The image capturing unit 10 may further include a preprocessing unit that performs predetermined image processing (preprocessing) such as a CDS process, as in the image capturing unit 10 in accordance with the first preferred embodiment.

As in the image capturing processing unit 20 in accordance with the first preferred embodiment, the image processing unit 20 performs various kinds of image processing in the image pickup device 100 on the image data input from the image capturing unit 10 under the control of a control unit (not shown), and then outputs data obtained through the image processing to the corresponding constituent elements of the image pickup device 100. Since the image processing unit 20 is the same as an image processing unit in accordance with the related art configured to correspond to a type of imager that simultaneously outputs pixel signals of two respective vertically (in the column direction) adjacent pixels in sequence, the detailed description thereof will not be repeated.

As in the AE evaluation value calculating unit 40 in accordance with the first preferred embodiment, the AE evaluation value calculating unit 40 calculates (generates) an AE evaluation value obtained by integrating the image data of each color (R, Gr, Gb, and B in the imager having the Bayer array shown in FIG. 2) input from the image capturing unit 10 under the control of the control unit (not shown) and outputs the generated AE evaluation value to the constituent elements of the image pickup device 100. Since the decimation unit 401 and the AE evaluation value generating unit 402 of the AE evaluation value calculating unit 40 are the same as the AE evaluation value calculating unit of the related art (for example, a second decimation unit and an AE evaluation value generating unit shown in FIG. 9), the detailed description thereof will not be repeated.

As in the AF evaluation value calculating unit 30 in accordance with the first preferred embodiment, the AF evaluation value calculating unit 30 generates a luminance signal (Y signal) based on the image data input from the image capturing unit 10 under the control of the control unit (not shown), calculates (generates) an AF evaluation value based on the generated Y signal, and outputs the calculated AF evaluation value to the constituent elements of the image pickup device 100. As in the AF evaluation value calculating unit 30 in accordance with the first preferred embodiment, the AF evaluation value calculating unit 30 includes a Y generating unit 301, a decimation unit 310, a vertical AF evaluation value generating unit 311, a decimation unit 320, and a horizontal AF evaluation value generating unit 321. Since the constituent elements of the AF evaluation value calculating unit 30 in accordance with the second preferred embodiment are the same as the constituent elements of the AF evaluation value calculating unit 30 in accordance with the first preferred embodiment, the detailed description thereof will not be repeated.

Figure 7:
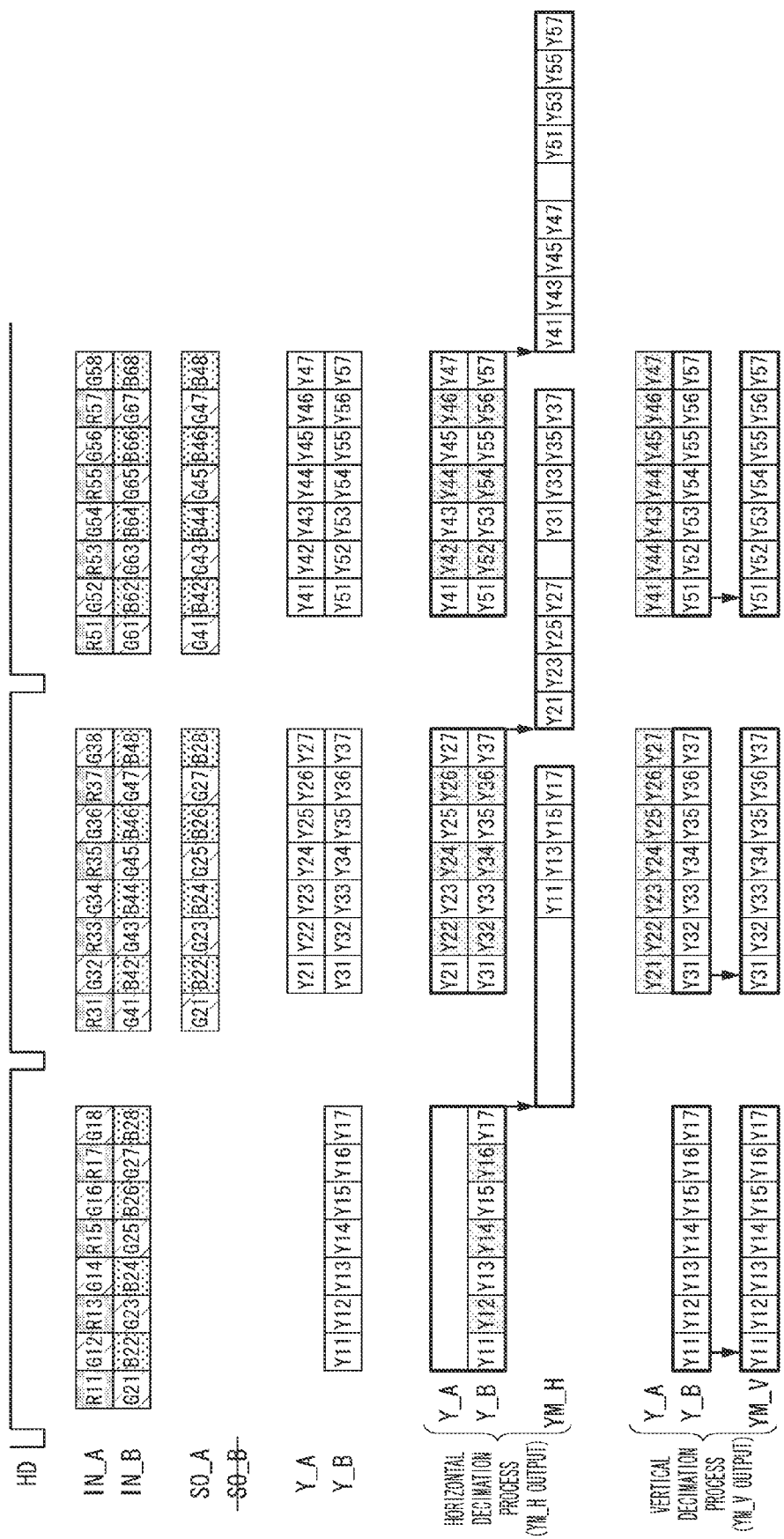
FIG. 7 is a timing chart illustrating an example of a processing timing of the AF evaluation value calculating unit of the image pickup device in accordance with a second preferred embodiment of the present invention.
Figure 8:
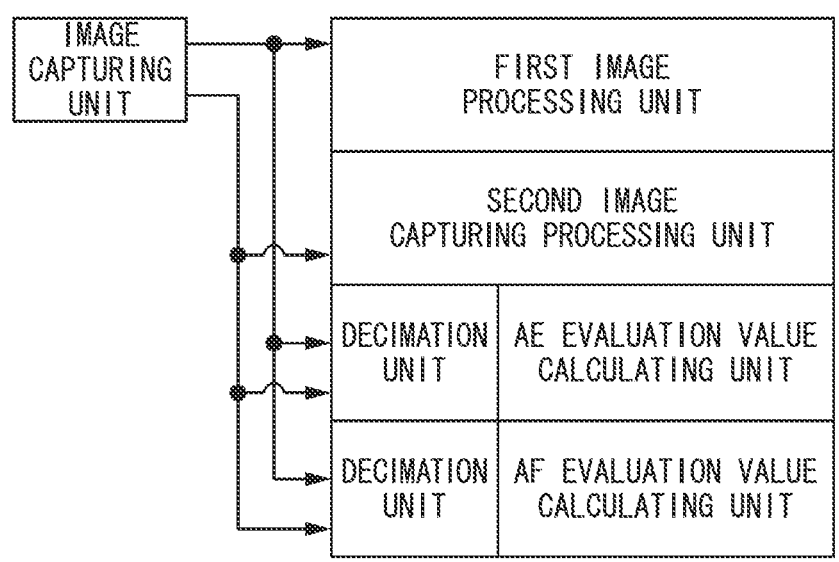
FIG. 8 is a block diagram illustrating an overall configuration of an image pickup device in accordance with the related art.

Next, the processing timing of the AF evaluation value calculating unit 30 will be described to describe the operation of the AF evaluation value calculating unit 30 of the image pickup device 100 in accordance with the second preferred embodiment. FIG. 7 is a timing chart illustrating an example of the processing timing of the AF evaluation value calculating unit 30 of the image pickup device 100 in accordance with the second preferred embodiment of the present invention. FIG. 7 shows the processing timing and data input via each signal line in the AF evaluation value calculating unit 30 when the image data is input to the AF evaluation value calculating unit 30 when the imager shown in FIG. 2 simultaneously outputs the pixel signals of two vertically (in the column direction) adjacent pixels.

First, a process of generating the Y signal data based on the image data output from the image capturing unit 10 will be described. During the period of a first image capturing synchronization signal HD, the image capturing unit 10 first sequentially outputs image data (R11, G12, R13, G14, R15, G16, R17, and G18) of R and Gr pixels of the first line arrayed on the imager via the signal line IN_A. Thus, the image data R11, G12, R13, G14, R15, G16, R17, and G18 of the R and Gr pixels is input sequentially to the Y generating unit 301. At the same time, the image capturing unit 10 sequentially outputs image data (G21, B22, G23, B24, G25, B26, G27, and B28) of Gr and B pixels of the second line arrayed on the imager via the signal line IN_B. Thus, the image data G21, B22, G23, B24, G25, B26, G27, and B28 of Gr and B pixels is input sequentially to the Y generating unit 301.

At this time, the SRAM 3011 of the Y generating unit 301 holds the image data (the image data G21, B22, G23, B24, G25, B26, G27, and B28 of the Gr and B pixels) sequentially input via the signal line IN_B. In the image pickup device 100 in accordance with the second preferred embodiment, the image data of the R and Gr pixels output via the signal line IN_A during the period of the previous image capturing synchronization signal HD is not used when the adding unit 3012 of the Y generating unit 301 generates the Y signal data. Therefore, the SRAM 3011 of the Y generating unit 301 in accordance with the second preferred embodiment is configured to hold only the image data of the Gr and B pixels sequentially input via the signal line IN_B and output the held image data via the signal line SO_A.

The adding unit 3012 of the Y generating unit 301 generates the Y signal data obtained by adding the image data of four adjacent pixels among the image data input via the signal lines IN_A and IN_B during the period of the first image capturing synchronization signal HD (see FIG. 3B). Then, the adding unit 3012 outputs the generated Y signal data Y11 to Y17 via the signal line Y_B. Thus, the Y signal data generated by the adding unit 3012 is input sequentially to the decimation units 310 and 320.

During the period of a second image capturing synchronization signal HD, the image capturing unit 10 sequentially outputs image data (R31, G32, R33, G34, R35, G36, R37, and G38) of the R and Gr pixels of the third line arrayed on the imager via the signal line IN_A. Thus, the image data R31, G32, R33, G34, R35, G36, R37, and G38 of the R and Gr pixels is input sequentially to the Y generating unit 301. At the same time, the image capturing unit 10 sequentially outputs image data (G41, B42, G43, B44, G45, B46, G47, and B48) of the Gr and B pixels of the fourth line arrayed on the imager via the signal line IN_B. Thus, the image data G41, B42, G43, B44, G45, B46, G47, and B48 the Gr and B pixels is input sequentially to the Y generating unit 301.

At this time, the SRAM 3011 of the Y generating unit 301 outputs the image data (the image data G21, B22, G23, B24, G25, B26, G27, and B28 of the Gr and B pixels) held during the period of the first image capturing synchronization signal HD via the signal line SO_A. At the same time, the SRAM 3011 holds the image data (the image data G41, B42, G43, B44, G45, B46, G47, and B48 of the Gr and B pixels) sequentially input via the signal line IN_B. Thus, as understood from FIG. 7, the image data corresponding to three lines used to generate the Y signals is input sequentially to the adding unit 3012 of the Y generating unit 301.

The adding unit 3012 of the Y generating unit 301 generates the Y signal data obtained by adding the image data of four adjacent pixels among the image data (the image data G21, B22, G23, B24, G25, B26, G27, and B28 of the Gr and B pixels) input via the signal line SO_A during the period of the first image capturing synchronization signal HD and the image data (the image data R31, G32, R33, G34, R35, G36, R37, and G38 of the R and Gr pixels) input via the signal line IN_A during the period of the second image capturing synchronization signal HD (see FIG. 3B). Then, the adding unit 3012 sequentially outputs the generated Y signal data Y21 to Y27 via the signal line Y_A.

The adding unit 3012 of the Y generating unit 301 generates the Y signal data obtained by adding the image data of four adjacent pixels among the image data input via the signal lines IN_A and IN_B during the period of the second image capturing synchronization signal HD (see FIG. 3B). Then, the adding unit 3012 outputs the generated Y signal data Y31 to Y37 via the signal line Y_B. Thus, the Y signal data generated by the adding unit 3012 is input sequentially to the decimation units 310 and 320.

Thereafter, the image capturing unit 10 repeatedly outputs the image data arrayed on the imager via the signal lines IN_A and IN_B in the same way for each image capturing synchronization signal HD. Then, the Y generating unit 301 repeatedly generates and outputs the Y signal data based on the image data held during the period of the previous image capturing synchronization signal HD and the image data input during the period of the current image capturing synchronization signal HD and repeatedly generates and outputs the Y signal data based on the image data corresponding to two lines held during the period of the current image capturing synchronization signal HD.

Thus, the image capturing unit 10 sequentially outputs the image data in accordance with the output method of the imager and the Y generating unit 301 sequentially generates the Y signal data based on the image data input from the image capturing unit 10.

Next, the horizontal decimation process of decimating the Y signal data output from the Y generating unit 301 will be described. The decimation unit 310 starts the horizontal decimation process when the Y signal data is input via the signal line Y_B from the Y generating unit 301 during the period of the first image capturing synchronization signal HD.

In the horizontal decimation process performed by the decimation unit 310, as shown in c of FIG. 4, the even Y signal data is decimated out in the horizontal direction among the input Y signal data, and thus only the odd Y signal data remains. Then, the odd Y signal data is sequentially output as the horizontally decimated Y signal data via the signal line YM_H. As understood from FIG. 7, during the period of the first image capturing synchronization signal HD, the Y signal data Y11 to Y17 is input to the decimation unit 310 via the signal line Y_B. Therefore, the decimation unit 310 sequentially outputs only the odd Y signal data Y11, Y13, Y15, and Y17 among the Y signal data Y11 to Y17 input via the signal line Y_B as the horizontally decimated Y signal data via the signal line YM_H.

Thus, the horizontally decimated Y signal data obtained through the horizontal decimation process performed by the decimation unit 310 is input sequentially to the vertical AF evaluation value generating unit 311. Then, the vertical AF evaluation value generating unit 311 generates the vertical AF evaluation value based on the horizontally decimated Y signal data.

As understood from FIG. 7, during the period of the second image capturing synchronization signal HD, the Y signal data Y21 to Y27 is input to the decimation unit 310 via the signal line Y_A and the Y signal data Y31 to Y37 is input to the decimation unit 310 via the signal line Y_B. Therefore, the decimation unit 310 sequentially outputs only the odd Y signal data among the Y signal data input via the signal lines Y_A and Y_B as the horizontally decimated Y signal data via the signal line YM_H in the order of the horizontally decimated Y signal data corresponding to the Y signal data input via the signal line Y_A and the horizontally decimated Y signal data corresponding to the Y signal data input via the signal line Y_B. More specifically, the decimation unit 310 sequentially outputs the odd Y signal data Y21, Y23, Y25, and Y27 among the Y signal data Y21 to Y27 input via the signal line Y_A as the horizontally decimated Y signal data via the signal line YM_H, and then sequentially outputs the odd Y signal data Y31, Y33, Y35, and Y37 among the Y signal data Y31 to Y37 input via the signal line Y_B as the horizontally decimated Y signal data via the signal line YM_H.

Thereafter, the decimation unit 310 repeatedly outputs the horizontally odd Y signal data input via the signal line Y_A as the horizontally decimated Y signal data via the signal line YM_H, and then repeatedly outputs the horizontally odd Y signal data input via the signal line Y_B as the horizontally decimated Y signal data via the signal line YM_H. Thus, the vertical AF evaluation value generating unit 311 repeatedly generates the vertical AF evaluation value.

Next, the vertical decimation process of decimating the Y signal data output from the Y generating unit 301 will be described. The decimation unit 320 starts the vertical decimation process when the Y signal data is input via the signal line Y_B from the Y generating unit 301 during the period of the first image capturing synchronization signal HD.

In the vertical decimation process performed by the decimation unit 320, as shown in d of FIG. 4, the vertically even Y signal data is decimated out among the input Y signal data, and thus only the odd Y signal data remains. Then, the odd Y signal data is sequentially output as the vertically decimated Y signal data via the signal line YM_V. As understood from FIG. 7, during the period of the first image capturing synchronization signal HD, the vertically odd Y signal data Y11 to Y17 is input to the decimation unit 320 via the signal line Y_B. Therefore, the decimation unit 320 sequentially outputs the Y signal data Y11 to Y17 input via the signal line Y_B as the vertically decimated Y signal data via the signal line YM_V.

Thus, the vertically decimated Y signal data obtained through the vertical decimation process performed by the decimation unit 320 is sequentially input to the horizontal AF evaluation value generating unit 321. Then, the horizontal AF evaluation value generating unit 321 generates the horizontal AF evaluation value based on the vertically decimated Y signal data.

As understood from FIG. 7, during the period of the second image capturing synchronization signal HD, the vertically even Y signal data Y21 to Y27 is input to the decimation unit 320 via the signal line Y_A and the vertically odd Y signal data Y31 to Y37 is input to the decimation unit 320 via the signal line Y_B. Therefore, the decimation unit 320 sequentially outputs only the odd Y signal data Y31 to Y37 input via the signal line Y_B as the vertically decimated Y signal data via the signal line YM_V without outputting the even Y signal data Y21 to Y27 input via the signal line Y_A.

Thereafter, the decimation unit 320 repeatedly outputs only the vertically odd Y signal data input via the signal line Y_B as the vertically decimated Y signal data via the signal line YM_V. Thus, the horizontal AF evaluation value generating unit 321 repeatedly generates the horizontal AF evaluation value.

According to the second preferred embodiment, as described above, the method of decimating the Y signal data is changed depending on the characteristics of the AF evaluation value generation units on the rear stage, as in the first preferred embodiment. Accordingly, in the second preferred embodiment, the AF evaluation value generation units on the rear stage can also generate the AF evaluation values without deterioration in the accuracy, as in the first preferred embodiment.

More specifically, the vertical filtering unit 3111 of the vertical AF evaluation value generating unit 311 extracts the vertical frequency components. Further, the horizontal filtering unit 3211 of the horizontal AF evaluation value generating unit 321 extracts the horizontal frequency components. Therefore, when the image pickup device 100 includes a type of imager that simultaneously outputs the pixel signals of two vertically (in the column direction) adjacent pixels and the first decimation unit of the image pickup device in accordance with the related art shown in FIG. 9 performs a vertical decimation process on the input image data, the accuracy of the vertical AF evaluation value generated by the vertical AF evaluation value generating unit 311 extracting the vertical frequency components may deteriorate.

Even in the second preferred embodiment, the vertical frequency components are not decimated out, since the Y signal data input to the vertical AF evaluation value generating unit 311 is the horizontally decimated Y signal data obtained through the horizontal decimation process, as in the first preferred embodiment. That is, in the second preferred embodiment, the horizontal decimation process performed by the decimation unit 310 is a decimation process performed in a direction which less affects the accuracy of the horizontal AF evaluation value generated by the vertical AF evaluation value generating unit 311. Accordingly, the vertical AF evaluation value generating unit 311 can generate the vertical AF evaluation value without the deterioration in the accuracy.

In the second preferred embodiment, the Y signal data input to the horizontal AF evaluation value generating unit 321 is the vertically decimated Y signal data obtained through the vertical decimation process. That is, since the Y signal data input to the horizontal AF evaluation value generating unit 321 is the Y signal data obtained through the decimation process performed in a direction which less affects the accuracy of the horizontal AF evaluation value, the horizontal AF evaluation value generating unit 321 can also generate the horizontal AF evaluation value without the deterioration in the accuracy.

Thus, in the second preferred embodiment, the Y signal data obtained through the decimation process performed in the directions which less affect the accuracy of the AF evaluation values generated by the AF evaluation value generating units is input to the AF evaluation value generating units as in the first preferred embodiment. Accordingly, the AF evaluation value generating units can generate the corresponding AF evaluation values without a difference in the accuracy. In the second preferred embodiment, since the decimation process is performed on the input image data in one of the horizontal and vertical directions, it is not necessary to increase the operation speed of the AF evaluation value generating units and the power consumption can be prevented from increasing, as in the first preferred embodiment.

According to the preferred embodiments of the invention, as described above, the method of decimating the data used to generate the evaluation values is changed depending on the characteristics of the evaluation value generating units on the rear stage irrespective of the output method of outputting the image data from the image capturing unit. That is, when the image capturing unit includes a type of imager that simultaneously outputs the image data of the plurality of pixels, the decimation process is performed in the direction which less affects the accuracy of the evaluation values generated by the evaluation value generating units on the rear stage irrespective of the output method of outputting the image data output by the image capturing unit (imager).

More specifically, the decimation method of decimation the data used to generate the evaluation values is changed so that the evaluation value generating unit, which generates the evaluation value in the vertical direction in which the vertical components are extracted, inputs the data obtained through the decimation process in the direction which less affects the accuracy of the evaluation value and the evaluation value generating unit, which generates the evaluation value in the horizontal direction in which the horizontal components are extracted, inputs the data obtained through the decimation process in the direction which less affects the accuracy of the evaluation value. Thus, the evaluation value generating units on the rear stage can generate the evaluation values with stable accuracy so that the accuracy of the generated evaluation values does not deteriorate according to the output method of outputting the image data output from the image capturing unit.

According to the preferred embodiments of the invention, the decimation processes are performed before the data used to generate the evaluation value is input to the evaluation value generating units. Therefore, to prevent the deterioration in the accuracy of the evaluation values, it is not necessary to generate the evaluation values without performing the decimation process. Further, to equalize the times necessary to generate the evaluation values, it is not necessary to increase the operation speed of the evaluation value generating units. The increase in the circuit size of the evaluation value generating units or the increase in the power consumption can be suppressed.

In the preferred embodiments, the case in which the decimation unit 310 performs the decimation process of decimating the horizontally even Y signal data and the decimation unit 320 performs the decimation process of decimating the vertically even Y signal data has been described. That is, the case in which the decimation unit 310 outputs the horizontally odd Y signal data as the horizontally decimated Y signal data and the decimation unit 320 outputs the vertically odd Y signal data as the vertically decimated Y signal data has been described. However, the mode for carrying out the invention is not limited to the method of the decimation processes performed by the decimation units 310 and 320. For example, the decimation unit 310 may perform a decimation process of decimating the horizontally odd Y signal data and the decimation unit 320 may perform a decimation process of decimating the vertically odd Y signal data. That is, the decimation unit 310 may output the horizontally even Y signal data as the horizontally decimated Y signal data and the decimation unit 320 may output the vertically even Y signal data as the vertically decimated Y signal data. Further, another method of the decimation process is applicable.

In the preferred embodiments, the case in which the AF evaluation value calculating unit 30 includes the Y generating unit 301, and the Y generating unit 301 generates the Y signal data based on the image data corresponding to the pixels of the imager input from the image capturing unit 10 and then inputs the Y signal data obtained through the decimation processes performed by the decimation units 310 and 320 to the vertical AF evaluation value generating unit 311 and the horizontal evaluation value generating unit 321 has been described. However, the invention is not limited to the data obtained through the decimation processes. For example, the AF evaluation value calculating unit 30 may not include the Y generating unit 301. The decimation units 310 and 320 may perform the decimation processes on the image data output from the image capturing unit 10, and the vertical evaluation value generating unit 311 and the horizontal AF evaluation value generating unit 321 may generate the vertical and horizontal evaluation values, respectively, based on the image data obtained through the decimation processes. In this case, the vertical evaluation value generating unit 311 and the horizontal AF evaluation value generating unit 321 are configured to generate the vertical and horizontal evaluation values, respectively, based on, for example, the image data of the R and B pixels or the image data of the Gr and Gb pixels.

In the preferred embodiments, the case in which an evaluation value generating unit or an evaluation value generating device is the AF evaluation value calculating unit 30 and the AF evaluation value calculating unit 30 includes the vertical AF evaluation value generating unit 311, which is a vertical evaluation value generating unit, and the horizontal AF evaluation value generating unit 321, which is a horizontal evaluation value generating unit, generating the vertical AF evaluation value and the horizontal AF evaluation value, respectively, has been described. However, the mode for carrying out the invention is not limited to the evaluation value generating unit or the evaluation value generating device. That is, the invention is applicable as long as an evaluation value generating unit generates an evaluation value obtained by extracting the vertical components and an evaluation value obtained by the extracting the horizontal components or an evaluation value generating device includes the evaluation value generating unit. Accordingly, the evaluation values in which there is no difference in accuracy can be generated, as in the above-described preferred embodiments of the invention.

In the preferred embodiments, the case in which the Y generating unit 301 is provided as a signal processing unit of the AF evaluation value calculating unit 30 which is an evaluation value generating unit or an evaluation value generating device and the AF evaluation value is generated based on the generated Y signal has been described. However, the mode for carrying out the invention is not limited to the signal processing unit of the evaluation value generating unit or the evaluation value generating device. For example, a color difference generating unit generating color difference data may be provided as the signal processing unit. The generated color difference data may be subjected to the decimation processes in the horizontal and vertical directions, and then the vertical evaluation value obtained by extracting the vertical components and the horizontal evaluation value obtained by extracting the horizontal components may be generated.

In the preferred embodiments, the case in which the numbers of pixels arrayed on the imager in the row and column directions are six rows and eight columns has been described. However, the mode for carrying out the invention is not limited to the numbers of pixels arrayed on the imager in the row and column directions. The numbers of pixels arrayed in the row and column directions may be modified without departing from the gist of the invention. For example, an imager on which 4000 pixels are arrayed in the row direction and 3000 pixels are arrayed in the column direction may be considered to be realized in the preferred embodiments.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image pickup device comprising:
   an image capturing unit that includes a solid-state image pickup device having a plurality of pixels arrayed in a matrix form, the image capturing unit sequentially outputting a plurality of image capturing signals each of which corresponds to one of a plurality of pixel signals output from the solid-state image pickup device; and
   an evaluation value generating unit to which the plurality of image capturing signals output from the image capturing unit are sequentially input, the evaluation value generating unit generating an evaluation value based on the input image capturing signals, wherein
   the evaluation value generating unit comprises:
      a horizontal decimator that performs a horizontal decimation process of decimating the sequentially input image capturing signals in a row direction of the pixels arrayed in the solid-state image pickup device, the horizontal decimator sequentially outputting the image capturing signals obtained through the horizontal decimation process;
      a vertical decimator that performs a vertical decimation process of decimating the sequentially input image capturing signals in a column direction of the pixels arrayed in the solid-state image pickup device, the vertical decimator sequentially outputting the image capturing signals obtained through the vertical decimation process;
      a vertical evaluation value generator that includes a vertical filtering unit extracting column-direction components of the pixels arrayed in the solid-state image pickup device from the sequentially input image capturing signals, the vertical evaluation value generator generating a column-direction evaluation value based on signals obtained through a filtering process performed by the vertical filtering unit; and
      a horizontal evaluation value generator that includes a horizontal filtering unit extracting row-direction components of the pixels arrayed in the solid-state image pickup device from the sequentially input image capturing signals, the horizontal evaluation value generator generating a row-direction evaluation value based on signals obtained through a filtering process performed by the horizontal filtering unit,
   the evaluation value generating unit sequentially inputs signals corresponding to the plurality of image capturing signals sequentially output from the image capturing unit as input signals of the horizontal and vertical decimation units, the evaluation value generating unit sequentially inputs the image capturing signals obtained through the decimation process performed in the row direction by the horizontal decimation unit as input signals of the vertical evaluation value generating unit, and the evaluation value generating unit sequentially inputs the image capturing signals obtained through the decimation process performed in the column direction by the vertical decimation unit as input signals of the horizontal evaluation value generating unit.

2. The image pickup device according to claim 1, wherein the evaluation value generating unit further comprises: a signal processing unit which performs image processing on sequentially input image signals and sequentially outputs signals generated through the signal processing, the evaluation value generating unit sequentially inputs the plurality of image capturing signals sequentially output from the image capturing unit as the image signals input to the signal processing unit, and the evaluation value generating unit sequentially inputs the signals processed by the signal processing unit as the input signals of the horizontal and vertical decimation units.

3. The image pickup device according to claim 2, wherein the signal processing unit performs signal processing to generate luminance signals based on the plurality of input image capturing signals, and the evaluation value generating unit sequentially inputs the luminance signals generated by the signal processing unit as the input signals of the horizontal and vertical decimation units.

4. The image pickup device according to claim 1, wherein the evaluation value generating unit sequentially inputs the plurality of image capturing signals sequentially output from the image capturing unit as the input signals of the horizontal and vertical decimation units.

5. The image pickup device according to claim 3, wherein when the image capturing unit simultaneously outputs the image capturing signals of two pixels that are adjacent in the row direction of the pixels arrayed in the solid-state image pickup device and each of which corresponds to one of the pixel signals of the two pixels that are adjacent in the row direction in sequence from corresponding output terminals, the image capturing signals of the two pixels in the row direction which are simultaneously output from the image capturing unit are input sequentially to the evaluation value generating unit via corresponding input terminals, and an evaluation value is generated based on the input image capturing signals of the two pixels in the row direction, the horizontal decimator outputs the image capturing signal input via one of the input terminals among the signals each of which is input via the input terminals as the signal obtained through the decimation process performed in the row direction, and the vertical decimator does not output all of the signals each of which is input via the input terminals in a row in which the input signals are decimated out, and outputs the signals rearranged from all of the image capturing signals each of which is input from the input terminals as the signals obtained through the decimation process performed in the column direction in a row in which the input signals are not decimated out.

6. The image pickup device according to claim 4, wherein when the image capturing unit simultaneously outputs the image capturing signals of two pixels that are adjacent in the row direction of the pixels arrayed in the solid-state image pickup device and each of which corresponds to one of the pixel signals of the two pixels that are adjacent in the row direction in sequence from corresponding output terminals, the image capturing signals of the two pixels in the row direction which are simultaneously output from the image capturing unit are input sequentially to the evaluation value generating unit via corresponding input terminals, and an evaluation value is generated based on the input image capturing signals of the two pixels in the row direction, the horizontal decimator outputs the image capturing signal input via one of the input terminals among the signals each of which is input via the input terminals as the signal obtained through the decimation process performed in the row direction, and the vertical decimator does not output all of the signals each of which is input via the input terminals in a row in which the input signals are decimated out, and outputs the signals rearranged from all of the image capturing signals each of which is input from the input terminals as the signals obtained through the decimation process performed in the column direction in a row in which the input signals are not decimated out.

7. The image pickup device according to claim 3, wherein when the image capturing unit simultaneously outputs the image capturing signals of two pixels that are adjacent in the column direction of the pixels arrayed in the solid-state image pickup device and each of which corresponds to the pixel signals of the two pixels that are adjacent in the column direction in sequence from output terminals, the image capturing signals of the two pixels in the column direction which are simultaneously output from the image capturing unit are input sequentially to the evaluation value generating unit via input terminals, and an evaluation value is generated based on the input image capturing signals of the two pixels in the column direction, the horizontal decimator does not output the signals of a column input from the input terminals and subjected to the decimation process and sequentially outputs the signals of a column each of which is input from the input terminals and not subjected to the decimation process as the signal obtained through the decimation process performed in the row direction in order of the input terminals, and the vertical decimator outputs the signal input via one of the input terminals among the signals each of which is input via the input terminals as the signal obtained through the decimation process performed in the column direction.

8. The image pickup device according to claim 4, wherein when the image capturing unit simultaneously outputs the image capturing signals of two pixels that are adjacent in the column direction of the pixels arrayed in the solid-state image pickup device and each of which corresponds to the pixel signals of the two pixels that are adjacent in the column direction in sequence from output terminals, the image capturing signals of the two pixels in the column direction which are simultaneously output from the image capturing unit are input sequentially to the evaluation value generating unit via input terminals, and an evaluation value is generated based on the input image capturing signals of the two pixels in the column direction, the horizontal decimator does not output the signals of a column input from the input terminals and subjected to the decimation process and sequentially outputs the signals of a column each of which is input from the input terminals and not subjected to the decimation process as the signal obtained through the decimation process performed in the row direction in order of the input terminals, and the vertical decimator outputs the signal input via one of the input terminals among the signals each of which is input via the input terminals as the signal obtained through the decimation process performed in the column direction.

9. An evaluation value generating device, which generates an evaluation value based on a plurality of image capturing signals sequentially input from an image capturing unit that includes a solid-state image pickup device having a plurality of pixels arrayed in a matrix form and sequentially outputs the plurality of image capturing signals each of which corresponds to a plurality of pixel signals output from the solid-state image pickup device, the evaluation value generating device comprising:

a horizontal decimator that performs a horizontal decimation process of decimating the sequentially input image capturing signals in a row direction of the pixels arrayed in the solid-state image pickup device, the horizontal decimation unit sequentially outputting the image capturing signals obtained through the horizontal decimation process;

a vertical decimator that performs a vertical decimation process of decimating the sequentially input image capturing signals in a column direction of the pixels arrayed in the solid-state image pickup device, the vertical decimation unit sequentially outputting the image capturing signals obtained through the vertical decimation process;

a vertical evaluation value generator that includes a vertical filtering unit extracting column-direction components of the pixels arrayed in the solid-state image pickup device from the sequentially input image capturing signals, the vertical evaluation value generating unit generating a column-direction evaluation value based on signals obtained through a filtering process performed by the vertical filtering unit; and a horizontal evaluation value generator that includes a horizontal filtering unit extracting row-direction components of the pixels arrayed in the solid-state image pickup device from the sequentially input image capturing signals, the horizontal evaluation value generating unit generating a row-direction evaluation value based on signals obtained through a filtering process performed by the horizontal filtering unit, wherein the evaluation value generating device sequentially inputs signals corresponding to the plurality of image capturing signals sequentially output from the image capturing unit as input signals of the horizontal and vertical decimation units, the evaluation value generating device sequentially inputs the image capturing signals obtained through the decimation process performed in the row direction by the horizontal decimation unit as input signals of the vertical evaluation value generating unit, and the evaluation value generating device sequentially inputs the image capturing signals obtained through the decimation process performed in the column direction by the vertical decimation unit as input signals of the horizontal evaluation value generating unit.

* * * * *